United States Patent
Edge

(10) Patent No.: US 9,496,971 B2
(45) Date of Patent: Nov. 15, 2016

(54) TECHNIQUES FOR DETERMINING ACTUAL AND/OR NEAR STATES OF PROXIMITY BETWEEN MOBILE DEVICES

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 14/098,343

(22) Filed: Dec. 5, 2013

(65) Prior Publication Data

US 2014/0162688 A1 Jun. 12, 2014

Related U.S. Application Data

(60) Provisional application No. 61/735,490, filed on Dec. 10, 2012, provisional application No. 61/773,585, filed on Mar. 6, 2013.

(51) Int. Cl.
*H04W 16/26* (2009.01)
*H04B 7/04* (2006.01)
(Continued)

(52) U.S. Cl.
CPC .......... *H04H 20/08* (2013.01); *H04L 12/1845* (2013.01); *H04L 12/1868* (2013.01); *H04W 4/025* (2013.01); *H04W 4/028* (2013.01); *H04W 4/06* (2013.01); *H04W 8/005* (2013.01); *H04W 28/06* (2013.01); *H04W 40/00* (2013.01);
(Continued)

(58) Field of Classification Search
CPC .... H04B 7/2606; H04B 7/024; H04B 7/026; H04W 16/26; H04W 88/08; H04J 11/00; H04J 11/0053

USPC ......... 455/41.2–41.3, 405–408, 456.1–456.6
See application file for complete search history.

(56) References Cited

U.S. PATENT DOCUMENTS 6,414,635 B1 7/2002 Stewart et al.
7,095,336 B2 8/2006 Rodgers et al.
(Continued)

FOREIGN PATENT DOCUMENTS

EP 2386878 A1 11/2011
WO WO-2012088667 A1 7/2012

OTHER PUBLICATIONS

Myllymaki J., et al., "Location Aggregation from Multiple Sources," Proceedings of the Third International Conference on Mobile Data Management, 2002, pp. 131-138.

*Primary Examiner* — Nathan Taylor
(74) *Attorney, Agent, or Firm* — Berkeley Law & Technology Group, LLP

(57) ABSTRACT

Techniques are provided that may be implemented in various methods, apparatuses and articles of manufacture for use by one or more electronic devices to support proximity services for a mobile device. In an example implementation, a computing device may determine whether a first mobile device and a second mobile device are each operatively provisioned to make use of a common proximity service, use a first procedure to determine whether a state of near proximity exists between at least two mobile devices, use a second procedure to determine whether a state of proximity exists between the at least two mobile devices, and initiate notification of a user and/or an application of at least one of the mobile devices in response to one or more of such determinations.

31 Claims, 14 Drawing Sheets

(51) Int. Cl.
  *H04H 20/08* (2008.01)
  *H04W 8/00* (2009.01)
  *H04W 40/24* (2009.01)
  *H04W 28/06* (2009.01)
  *H04W 4/06* (2009.01)
  *H04W 40/00* (2009.01)
  *H04W 4/02* (2009.01)
  *H04W 84/10* (2009.01)
  *H04L 12/18* (2006.01)
  *H04W 84/18* (2009.01)
  *G01S 5/10* (2006.01)
  *G01S 5/14* (2006.01)
  *H04W 88/04* (2009.01)

(52) U.S. Cl.
  CPC ............ *H04W40/246* (2013.01); *G01S 5/10* (2013.01); *G01S 5/14* (2013.01); *H04L 12/189* (2013.01); *H04W 4/02* (2013.01); *H04W 4/023* (2013.01); *H04W 84/10* (2013.01); *H04W 84/18* (2013.01); *H04W 88/04* (2013.01)

(56) References Cited

U.S. PATENT DOCUMENTS

| | | | |
|---|---|---|---|
| 7,129,891 B2 | 10/2006 | Meunier | |
| 7,313,628 B2 | 12/2007 | Chaskar et al. | |
| 7,941,167 B2 | 5/2011 | Xu et al. | |
| 8,050,243 B2 | 11/2011 | Ostergren | |
| 8,321,092 B2 | 11/2012 | Browne et al. | |
| 8,661,151 B2 | 2/2014 | Sharkey | |
| 2002/0114350 A1* | 8/2002 | Tang | H04M 3/42 370/469 |
| 2003/0148771 A1 | 8/2003 | De | |
| 2004/0009750 A1* | 1/2004 | Beros et al. | 455/41.2 |
| 2004/0198398 A1* | 10/2004 | Amir et al. | 455/456.6 |
| 2006/0270419 A1 | 11/2006 | Crowley et al. | |
| 2007/0030824 A1 | 2/2007 | Ribaudo et al. | |
| 2007/0143499 A1* | 6/2007 | Chang | G06Q 10/10 709/245 |
| 2007/0150444 A1 | 6/2007 | Chesnais et al. | |
| 2008/0160985 A1 | 7/2008 | Variyath et al. | |
| 2008/0195312 A1 | 8/2008 | Aaron et al. | |
| 2008/0242311 A1 | 10/2008 | Craine et al. | |
| 2009/0068970 A1* | 3/2009 | Ahmed | H04W 48/16 455/161.1 |
| 2009/0143056 A1* | 6/2009 | Tang et al. | 455/418 |
| 2009/0197617 A1 | 8/2009 | Jayanthi | |
| 2010/0156624 A1 | 6/2010 | Hounsell | |
| 2010/0217660 A1 | 8/2010 | Biswas | |
| 2010/0268828 A1 | 10/2010 | Pahlavan et al. | |
| 2010/0273459 A1 | 10/2010 | Stern et al. | |
| 2010/0278345 A1* | 11/2010 | Alsina et al. | 380/283 |
| 2010/0311395 A1* | 12/2010 | Zheng et al. | 455/414.1 |
| 2011/0076942 A1 | 3/2011 | Taveau et al. | |
| 2011/0090093 A1 | 4/2011 | Grimm et al. | |
| 2011/0279323 A1 | 11/2011 | Hung et al. | |
| 2012/0015605 A1* | 1/2012 | Sole | 455/41.3 |
| 2012/0015606 A1* | 1/2012 | Beacham | H04B 7/18506 455/62 |
| 2012/0165035 A1 | 6/2012 | Chen et al. | |
| 2012/0235812 A1* | 9/2012 | Maia et al. | 340/539.13 |
| 2012/0235865 A1 | 9/2012 | Nath et al. | |
| 2012/0244847 A1 | 9/2012 | Chandra et al. | |
| 2012/0244885 A1 | 9/2012 | Hefetz | |
| 2012/0258703 A1 | 10/2012 | Hakola et al. | |
| 2013/0045759 A1* | 2/2013 | Smith | 455/456.6 |
| 2013/0288603 A1* | 10/2013 | Iwasaki | H04W 4/008 455/41.2 |
| 2013/0339436 A1* | 12/2013 | Gray | H04L 51/24 709/204 |
| 2014/0162544 A1 | 6/2014 | Edge | |
| 2014/0162545 A1 | 6/2014 | Edge | |
| 2014/0162685 A1 | 6/2014 | Edge | |
| 2014/0162687 A1 | 6/2014 | Edge | |

* cited by examiner

2000 ⤸

```
┌─────────────────────────────────────────────────────────────────────┐
│ Each terminal starts by periodically broadcasting information for   │
│ itself (e.g., its identity, current location and supported proximity│
│ services and an information version or timestamp)                   │
└─────────────────────────────────────────────────────────────────────┘
                                    ⤹ 2002
┌─────────────────────────────────────────────────────────────────────┐
│ Each terminal listens for broadcasts from other terminals (e.g. when│
│ not engaged in Block 2002) and stores any information received      │
└─────────────────────────────────────────────────────────────────────┘
                                    ⤹ 2004
┌─────────────────────────────────────────────────────────────────────┐
│ As information is received from some other terminal, it may be      │
│ combined with information already received such that received       │
│ information relating to a terminal T1 with version V or timestamp T │
│ replaces any previous information for T1 with a version less than V │
│ or a timestamp prior to T                                           │
└─────────────────────────────────────────────────────────────────────┘
                                    ⤹ 2006
┌─────────────────────────────────────────────────────────────────────┐
│ For future broadcasts at Block 2002, a terminal includes and relays │
│ information previously received and stored for other terminals (in  │
│ Blocks 2004 and 2006)                                               │
└─────────────────────────────────────────────────────────────────────┘
                                    ⤹ 2008
┌─────────────────────────────────────────────────────────────────────┐
│ A terminal T1 determines that another terminal T2 acknowledges      │
│ information that T1 sent previously for some terminal T3, in        │
│ response to information being received from T2 that implicitly or   │
│ explicitly acknowledges this information                            │
└─────────────────────────────────────────────────────────────────────┘
                                    ⤹ 2010
┌─────────────────────────────────────────────────────────────────────┐
│ In response to terminals, from which T1 receives broadcast directly,│
│ acknowledge the information stored in T1 for terminal T3, T1 ceases │
│ relaying information for T3                                         │
└─────────────────────────────────────────────────────────────────────┘
                                    ⤹ 2012
┌─────────────────────────────────────────────────────────────────────┐
│ T1 resumes relaying information for T3 after receiving new          │
│ information for T3 (e.g. with a higher version or later timestamp)  │
│ or when receiving a direct broadcast from some terminal T4 that did │
│ not yet acknowledge the information stored in T1 for terminal T3    │
└─────────────────────────────────────────────────────────────────────┘
                                    ⤹ 2014
```

FIG. 20

TECHNIQUES FOR DETERMINING ACTUAL AND/OR NEAR STATES OF PROXIMITY BETWEEN MOBILE DEVICES

CLAIM OF PRIORITY UNDER 35 U.S.C. §119

This patent application claims benefit of and priority to co-pending U.S. Provisional Patent Application 61/735,490, filed Dec. 10, 2012, entitled, "DISCOVERY AND SUPPORT OF PROXIMITY", and co-pending U.S. Provisional Patent Application 61/773,585, filed Mar. 6, 2013, entitled, "METHODS AND SYSTEMS FOR PREDICTING AND/OR DISCOVERING PROXIMITY OF MOBILE DEVICES", each of which is assigned to the assignee hereof and incorporated herein by reference.

BACKGROUND

1. Field

The subject matter disclosed herein relates to fixed and mobile devices, and more particularly to methods, apparatuses and articles of manufacture for use by one or more electronic devices to determine or assist in determining a state of proximity between two or more mobile devices.

2. Information

Communication networks enable communication between two or more electronic devices. Such communication may be used to enable and/or support a wide variety of different services. To name a few popular examples, various communication networks may enable/support telephone calling, video conferencing, electronic mailing, video streaming, a plethora of Internet-based services, location based services, and/or the like or some combination thereof.

In a particular example, the technology directed towards wireless communication networks, mobile devices and related services continues to change and improve at a rapid pace. Indeed, the increasing capability and popularity of mobile devices such as smartphones, tablet computers, wearable computers, and the like, continues to spark innovative uses and corresponding services and applications.

Accordingly, some services, applications, and/or other like processes may benefit from a determination as to whether certain mobile devices and their associated users may or may not be located nearby to one another, within a common area, and/or within a particular radio range of one another, etc. For example, applications on mobile devices that are found to be nearby to one another or nearby to certain fixed devices may be notified and enabled to perform services of value to their respective users such as notifying the users, establishing a voice or data session between the mobile devices without the use of an intermediate network and/or conveying information to the users associated with an area they are in.

SUMMARY

In accordance with an aspect, a method of supporting proximity services for a mobile device may comprise, with a computing device: determining whether a first mobile device and a second mobile device are each operatively provisioned to make use of a common proximity service; determining using a first procedure that a state of near proximity exists between the first and second mobile devices, wherein the first and second mobile devices are not in proximity; determining at a subsequent time and using a second procedure that a state of proximity exists between the first and second mobile devices, wherein the second procedure differs from the first procedure; and initiating notification of a user and/or an application of at least one of the first or second mobile devices that a state of proximity with the other mobile device has occurred.

In accordance with an aspect, an apparatus may be provided for use in supporting proximity services for a mobile device which comprises: means for determining whether a first mobile device and a second mobile device are each operatively provisioned to make use of a common proximity service; means for determining using a first procedure that a state of near proximity exists between the first and second mobile devices, wherein the first and second mobile devices are not in proximity; means for determining at a subsequent time and using a second procedure that a state of proximity exists between the first and second mobile devices, wherein the second procedure differs from the first procedure; and means for initiating notification of a user and/or an application of at least one of the first or second mobile devices that a state of proximity with the other mobile device has occurred.

In accordance with an aspect, a computing device may be provided to support proximity services for a mobile device which comprises: memory; and a processor to: determine whether a first mobile device and a second mobile device are each operatively provisioned to make use of a common proximity service; determine using a first procedure that a state of near proximity exists between the first and second mobile devices, wherein the first and second mobile devices are not in proximity; determine at a subsequent time and using a second procedure that a state of proximity exists between the first and second mobile devices, wherein the second procedure differs from the first procedure; and initiate notification of a user and/or an application of at least one of the first or second mobile devices that a state of proximity with the other mobile device has occurred.

In accordance with an aspect, an article of manufacture may be provided which comprises a non-transitory computer readable medium having stored therein computer implementable instructions executable by a processor in a computing device to: determine whether a first mobile device and a second mobile device are each operatively provisioned to make use of a common proximity service; determine using a first procedure that a state of near proximity exists between the first and second mobile devices, wherein the first and second mobile devices are not in proximity; determine at a subsequent time and using a second procedure that a state of proximity exists between the first and second mobile devices, wherein the second procedure differs from the first procedure; and initiate notification of a user and/or an application of at least one of the first or second mobile devices that a state of proximity with the other mobile device has occurred.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 20 is a flow diagram illustrating an example process that may be implemented to support all or part of a general broadcast and relaying method among terminals, e.g., without network support, in accordance with an example implementation.

DETAILED DESCRIPTION

Figure 1:
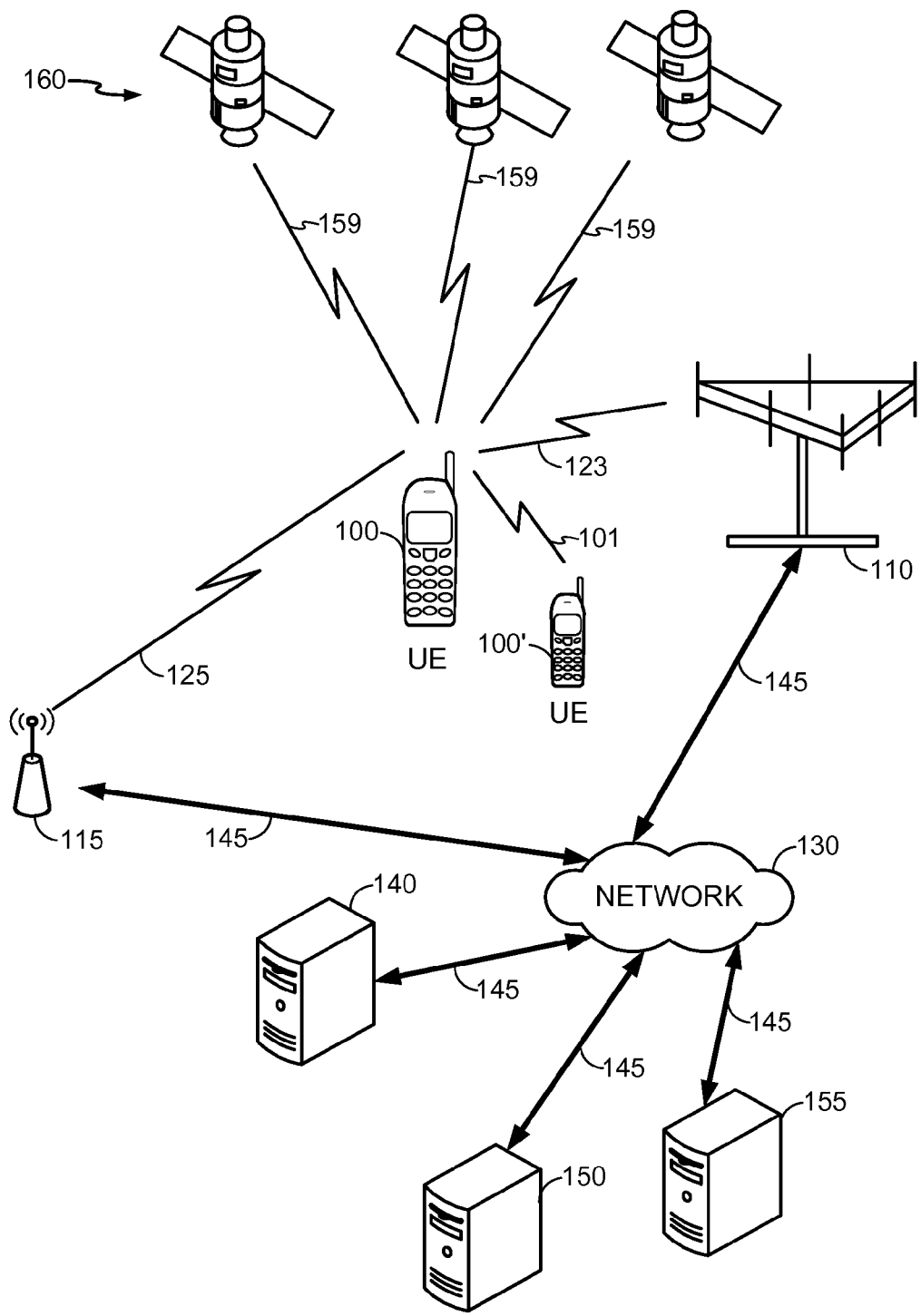
FIG. 1 is a schematic block diagram illustrating an arrangement of representative fixed and mobile devices that may be used to determine or assist in determining a state of proximity between two or more mobile devices, in accordance with an example implementation.

The following terms and abbreviations may apply to the description and drawings:
3GPP: 3rd Generation Partnership Project
AP: Access Point
API: Application Programming Interface
App: Application (software or firmware entity)
Appln: Application (protocol or interface)
CP: Control Plane
CSCF: Call Session Control Function
D2D: Device to Device (refers to direct communication between 2 devices)
DHCP: Dynamic Host Configuration Protocol
EPC: Evolved Packet Core (for LTE)
eNB: evolved Node B (eNodeB)
E-SMLC: Enhanced Serving Mobile Location Center
Expression: A piece of data (e.g. 128 bit string) that encodes the identity of a service performed for 2 or more UEs in proximity to one another.
FQDN: Fully Qualified Domain Name
GMLC: Gateway Mobile Location Center
GTP-U: General Packet Radio Service (GPRS) Tunneling Protocol-User Plane
HeNB: Home eNB
HSS: Home Subscriber Service
IETF: Internet Engineering Task Force
IM: Instant Message
IMS: IP Multimedia Subsystem
IMSI: International Mobile Subscriber Identity
IP: Internet Protocol
L1/L2/L3: Level 1/Level 2/Level 3
LTE: Long Term Evolution
LTE-D: LTE Direct (LTE version of D2D in which 2 UEs communicate directly via LTE and not via a network)
LRF: Location Retrieval Function
MAC: Media Access Control
MME: Mobility Management Entity
MSISDN: Mobile Station International Subscriber Directory Number
NAS: Non-Access Stratum
P2P: Peer to Peer
P-CSCF Proxy CSCF
PDCP: Packet Data Convergence Protocol
PDG: Packet Data Network Gateway
PDP: Proximity Discovery Protocol
PDU: Protocol Data Unit
ProSe: Proximity Services
PS-AP: Proximity Services Application Protocol
RFC: Request for Comments
RLC: Radio Link Control
RRC: Radio Resource Control
RTT: Round Trip Time
S1-AP: S1 Application Protocol
S-CSCF: Serving CSCF
SCTP: Stream Control Transmission Protocol
SGW: Serving Gateway
SIB: System Information Block
SIP: Session Initiation Protocol
SLP: SUPL Location Platform
SUPL: Secure User Plane Location
TA: Tracking Area
TCP: Transmission Control Protocol
TLS: Transport Layer Security
TMSI: Temporary Mobile Subscriber Identity
TS: Technical Specification
UDP: User Datagram Protocol
UE: User Equipment (e.g., a mobile device/station/terminal)
UP: User Plane
URI: Uniform Resource Identifier
URL: Uniform Resource Locator
WiFi-D: WiFi Direct (in which two UEs communicate directly using IEEE 802.11 WiFi signaling)

In the following description, the terms terminal, device, mobile terminal, mobile device, mobile station, station, user equipment (UE) are used interchangeably to refer to any wireless capable device that is mobile or potentially mobile such as a cellphone, smartphone, laptop or PDA. Further, the description below commonly assumes an LTE network and/or LTE signaling for use and support of proximity services although the methods described below may apply to other types of network and radio signaling in addition to LTE—e.g. may apply to networks and radio signaling that use WCDMA, GSM, cdma2000, WiFi, WiMax and other radio technologies. In any context below where a particular type of network or particular radio signaling is not specified explicitly or implicitly, the use of an LTE network or LTE signaling is intended at a minimum.

Wireless communication networks enable communication between two or more mobile wireless terminals and/or between any wireless terminal and one or more fixed entities such as a network server no matter where each wireless terminal may be located provided each terminal is in wireless coverage of some wireless network that can interconnect to other networks (e.g. via the Internet) and each terminal supports at least one particular type of wireless communication supported by the network it is coverage with. Many different services (e.g. voice calls, data calls, Email, IM, texting) may then be provided to each wireless terminal and/or to the user of each wireless terminal and/or to applications on each wireless terminal based on this communications capability. In some cases, additional services may be provided to two or more terminals that are in proximity to one another (e.g. within 500 meters of one another) based on a higher level of interest in or a higher priority for such services or an improved capability to provide such services in the context of this proximity. As an example, two friends or colleagues may have a higher interest in mutual communication when in proximity to one another; two public safety responders may have higher priority to establish communication when nearby to one another; and two terminals may be able to employ direct terminal to terminal communication without burdening a network when nearby to one another. For such reasons, it may be beneficial for a network and/or for a terminal to determine when the terminal is within proximity to one or more other terminals. The process of determining whether two terminals are within proximity to one another may be referred to as "discovery" and the process may be performed by one or both terminals, or by a network with which either terminal is in communication or by both a network and by one or both terminals.

Discovery or proximity may be based on the geographic location of each terminal with proximity being discovered when two terminals are within some maximum distance of one another (e.g. 500 meters). Discovery of proximity may instead be based on the ability of one terminal to directly receive signals transmitted by another terminal—for example to receive signals whose strength exceeds some minimum threshold. Each type of discovery may require the expenditure of significant time and resources by a network and/or by the respective terminals—e.g. time and resources to periodically measure and compare the geographic locations of the terminals or time and resources to transmit from a first terminal and receive by a second terminal signals distinct to the first terminal. The expenditure of such time and resources may be multiplied many fold when repeated for combinations of different pairs of terminals whose proximity may be of interest. Therefore, methods to enable discovery of proximity using fewer resources and less time may be of value. A further problem with discovering proximity and taking suitable actions when proximity is discovered (such as providing an indication of proximity to the respective users or to applications on each terminal) is that the duration of proximity may be short lived and any delay in discovering and reporting proximity may reduce the duration for which proximity has been reported to a low value or even zero. Thus, for example, notifying a pair of users in a shopping mall of their current proximity in order to allow the users to arrange an impromptu rendezvous may be seriously impaired if the notification occurs just as the reported proximity is about to end. Therefore, methods to discover the occurrence of proximity with little or no delay may also be of value.

In one implementation, the imminent geographic proximity of two or more terminals may be predicted in advance based on the probable future locations of the terminals. The probable future location of any terminal may be determined by extrapolating the current and past location and motion of the terminal to predict its location (or an area or volume within which it should be located) at some future time. The probably future location of a terminal may also be determined based on any known historic behavior of the terminal (or more precisely of the user of the terminal) that has occurred in association with the current location of the terminal and/or in association with the current day and time. Examples of such behavior based location prediction may include (i) a user who is known to typically be at home, in a restaurant or at a workplace at certain times and on certain days; (ii) a user who habitually walks around a shopping mall after driving into and parking near a main entrance to the shopping mall; (iii) a user who takes a daily walk or daily jog at a certain time each day and using one of a small number of different routes which may be distinguished by the user's heading and location soon after starting; and (iv) a user who visits a certain friend or relative by traveling there from home or from a workplace on certain days and/or at certain times using the same route for travel each time.

In one implementation, a UE or a network server may predict a form of geographic location based on the UE's current location, speed and heading plus recent movement and/or historical location history. Here, such a UE or server may predict an occurrence of geographic proximity to another UE before it occurs—giving UE users and UE applications more time to react. In an alternative implementation, imminent geographic proximity may be predicted, at least in part, based on detection of two UEs being in the same venue (e.g., a shopping mall, building, convention center, railway or bus station or an airport) even if the geographical separation of the two UEs currently exceeds a particular threshold range defining proximity.

Discovery of proximity between two devices, whether based on an ability to communicate directly between the devices (e.g., using LTE-D) or based on geographic location and geographic separation, is likely to be a resource intensive process for UEs and/or networks. This may well increase capital and operating costs for network operators and/or impair battery life and service provision for UEs. In addition, this may impair the effectiveness of proximity support—e.g. if there are delays in discovering whether two UEs are in proximity as a result of the limited resources available for this.

In one implementation, a condition of "near proximity" may indicate a condition in which two UEs are close to one another but not close enough to qualify for being in actual proximity. As an example, if actual proximity is defined as having a maximum separation of 2000 meters, near proximity may be defined for a separation of between 2000 and 5000 meters. A benefit of discovering near proximity may be that it would not need to be determined very exactly—allowing coarse but resource efficient methods to be used for support (e.g. methods that use fewer network and/or UE resources but are not able to determine a state of proximity very accurately). Moreover, near proximity need not be reported to applications or users, but only maintained by network servers and/or by some common proximity process or proximity engine in each UE. Once near proximity has been discovered by coarse but efficient means, more accurate but less resource efficient methods can be used to discover actual proximity for those UEs already discovered to be in near proximity. Because the number of UEs in near proximity to one another for any proximity service of interest to particular users and/or to particular applications may comprise only a small fraction of any total number of UEs that are potentially in actual proximity to one another in any area or region, using less efficient methods for determining actual proximity may not consume so many resources as when the same less efficient methods are applied to all UEs without any initial precondition. In addition, determining near proximity prior to discovering actual proximity may reduce a delay for discovering actual proximity. Accordingly, near proximity may also be used to efficiently support discovery of proximity between UEs served by different networks.

In certain implementations, as shown in FIG. 1, a UE 100 may receive or acquire satellite positioning system (SPS) signals 159 from SPS satellites 160. In some implementations, SPS satellites 160 may be from one global navigation satellite system (GNSS), such as the GPS or Galileo satellite systems. In other implementations, the SPS Satellites may be from multiple GNSS such as, but not limited to, GPS, Galileo, Glonass, or Beidou (Compass) satellite systems. In other implementations, SPS satellites may be from any one of several regional navigation satellite systems (RNSS) such as, for example, Wide Area Augmentation System (WAAS), European Geostationary Navigation Overlay Service (EGNOS), Quasi-Zenith Satellite System (QZSS), just to name a few examples.

In addition, UE 100 may transmit radio signals to, and receive radio signals from, a wireless communication network. In one example, UE 100 may communicate with a cellular communication network by transmitting wireless signals to, or receiving wireless signals from, base station transceiver 110 over wireless communication link 123. Similarly, UE 100 may transmit wireless signals to, or receive wireless signals from local transceiver 115 over wireless communication link 125.

In a particular implementation, local transceiver 115 may be configured to communicate with UE 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on link 125 according to a cellular communication protocol. Of course it should be understood that these are merely examples of networks that may communicate with a UE over a wireless link, and claimed subject matter is not limited in this respect.

In a particular implementation, base station transceiver 110 and local transceiver 115 may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between UE 100 and servers 140, 150 or 155 through local transceiver 115 or base station transceiver 110. In another implementation, network 130 may comprise cellular communication network infrastructure such as, for example, a base station controller or master switching center (not shown) to facilitate mobile cellular communication with UE 100.

In particular implementations, and as discussed below, UE 100 may have circuitry and processing resources capable of computing a position fix or estimated location of UE 100. For example, UE 100 may compute a position fix based, at least in part, on pseudorange measurements to four or more SPS satellites 160. Here, UE 100 may compute such pseudorange measurements based, at least in part, on pseudonoise code phase detections in signals 159 acquired from four or more SPS satellites 160. In particular implementations, UE 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, UE 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from UE 100 may be measured to three or more of such terrestrial transmitters fixed at known locations based, at least in part, on pilot signals transmitted by the transmitters fixed at known locations and received at UE 100. Alternatively, in other implementations, a difference in range between UE 100 and a pair of base station transceivers 110 may be obtained from a measurement by UE 100 of the difference in transmission timing between the pair of transceivers as seen at the location of UE 100. The difference in range between UE 100 and two or more different pairs of transceivers may be used to estimate a location of UE 100 by means of trilateration. Here, servers 140, 150 or 155 may be capable of providing positioning assistance data to UE 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions. In some implementations, UE 100 may both measure and determine its estimated location whereas in other implementations, UE 100 may perform location measurements but return the results of the measurements to a server (e.g. server 140, 150 or 155) for computation of a location for UE 100. In some implementations, communication between UE 100 and one or more of servers 140, 150 and 155 to enable UE 100 to perform location measurements and enable UE 100 or one of servers 140, 150 or 155 to determine a location for UE 100 may be according to a control plane location solution such as solutions defined by the $3^{rd}$ Generation Partnership Project (3GPP) and by the $3^{rd}$ Generation Partnership Project 2 (3GPP2). In other implementations, this communication between UE 100 and servers 140, 150 and 155 may be according to a user plane location solution such as the Secure User Plane Location (SUPL) location solution defined by the Open Mobile Alliance (OMA).

In particular environments such as indoor environments or urban canyons, UE 100 may not be capable of acquiring signals 159 from a sufficient number of SPS satellites 160 or from a sufficient number of base station transceivers 110 whose location are known to perform AFLT or OTDOA to compute a position fix. Alternatively, UE 100 may be capable of computing a position fix based, at least in part, on signals acquired from local transmitters (e.g., WLAN access points positioned at known locations). For example, UEs may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT) for signal propagation. In alternative implementations, UE 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, UE 100 may receive positioning assistance data for indoor positioning operations from servers 140, 150 or 155. For example, such positioning assistance data may include locations and identities of transmitters positioned at known locations to enable measuring ranges or measuring differences in ranges to these transmitters based, at least in part, on a measured RSSI and/or RTT and/or transmission time difference of arrival, for example. Other positioning assistance data to aid indoor positioning operations may include radio heatmaps, magnetic heatmaps, locations and identities of transmitters, routeability graphs, just to name a few examples. Other assistance data received by the UE may include, for example, local maps of indoor areas for display or to aid in navigation. Such a map may be provided to UE 100 as UE 100 enters a particular indoor area. Such a map may show indoor features such as doors, hallways, entry ways, walls, etc., points of interest such as bathrooms, pay phones, room names, stores, etc. By obtaining and displaying such a map, a UE may overlay a current location of the UE (and user) over the displayed map to provide the user with additional context.

In some implementations a pair of UEs (e.g., UE 100 and UE 100') in FIG. 1 may be in proximity to one another. The proximity may be determined by estimating the geographic location of each UE using for example the methods described previously and determining that the distance between the two geographic locations is less than some maximum threshold. The proximity may alternatively be determined from the ability of one UE to receive a signal 101 transmitted by the other UE with a strength greater than some minimum threshold. The proximity may also be determined from the ability of one UE to obtain an RTT to the other UE by directly exchanging signals with the other UE (e.g. using LTE-D or WiFi-D) and measuring the propagation time and subsequently determining that the distance between the two UEs based on the RTT is less than some maximum threshold. The discovery of proximity may occur in one or both UEs or may be performed by a serving network for the UEs—e.g. network 130—or by a server attached to or reachable from network 130 such as server 140, 150 or 155. The discovery may also involve interaction between the UEs, the network 130 and/or servers 140, 150 and/or 155. In some other implementations, the UEs may not be currently in proximity but may be in proximity at a later time with such later proximity predicted or anticipated by the UEs, network 130 and/or by servers 140, 150 and/or 155. The prediction or anticipation of future proximity may be based, at least in part, on one or more of: (i) current location, speed and heading of one or both UEs; (ii) previous location, speed and heading of one or both UEs; (iii) previous user location history for one or both UEs; (iv) determination that both UEs are in the same venue; and (v) determination that UEs are in near proximity to one another.

Proximity Services, Discovery and Expressions

In accordance with certain aspects, various example techniques are provided herein which may be implemented to provide support of discovery for proximity services (ProSe) and/or other like services, in general; and, in certain instances, support of communication for individual proximity services using LTE-D and/or the like.

Some of these example techniques are based on geographic proximity (e.g., related to geographic distance between nearby devices); and, in certain instances, ProSe support using LTE-D where network support may be unavailable.

As used herein, a "proximity service" may be any service that is provided to the user of a first device and/or to an application running on the first device that is contingent on the first device being in proximity to one or more other devices that support or are associated with the same service. A proximity service may just constitute a notification to the user and/or to the application that the first device is in proximity to one or more other devices supporting or associated with this service and may, in this case, provide some identification for each of these other devices—e.g. a phone number, a subscriber or user identity, a device identity—as well as information for the other devices such as the location of each device relative to the first device. A proximity service may instead or in addition provide communication capability with the other devices (which may require permission from the respective users before being setup) in the form of voice, video, IM and/or text to name a few examples. A proximity service may also enhance some existing service—for example by replacing some existing communication channel between the first device and one or more of the other devices that is supported by a network with an equivalent communication channel that employs direct device to device communication (e.g. LTE-D) and does not reply on support by a network. Such an enhanced service may improve communication quality, reduce communication delay, reduce network operator billing and/or reduce usage of network resources. A proximity service may be associated with a particular application on a device (e.g. may provide enhanced service specifically for this application). Discovering whether two or more devices are in proximity may then be performed in association with the particular service that can be enhanced or enabled by the resulting proximity. In particular, it may then be necessary to first determine whether two or more devices are capable of supporting and have an interest in supporting the same proximity service prior to discovering whether they are in proximity since if the devices have no proximity service in common, there would be no benefit in their being in proximity. Furthermore, some proximity services may be restricted to particular sets of devices or users (e.g., a particular set of friends or the employees of a particular company or the customers of a particular shopping chain) or particular types of devices (e.g. a particular brand of phone) or devices or users with some other common characteristic (e.g. an interest in stamp collecting). In still other cases, proximity services may be restricted to asymmetric groupings of devices—e.g. devices belonging to shoppers in a shopping mall and to stores in the shopping mall—where proximity is only of interest when it occurs between devices belonging to different categories (e.g. shoppers and stores in the previous example). In order to identify proximity services and help determine whether two or more devices have a mutual interest in the same proximity service, each proximity service may be assigned an identifier which may employ a particular sequence of bits called an "expression".

As used herein, an expression may provide a globally unique identification for a particular proximity service performed on behalf of a particular set of users or applications. In certain instances, an expression may comprise a limited number of bits (e.g. 128 bits) that may be broadcast by UEs and base stations without significant impact on bandwidth usage. A UE that receives an expression broadcast by another UE may then be able to determine whether the expression relates to a proximity service of common interest to both UEs and whether the other UE is also in proximity.

In an example implementation, UEs may broadcast one or more expressions in an attempt to discover and be discovered by one or more other UEs. Here, for example, in certain instances, two UEs associated with (e.g. that each broadcast) the same expression may be assumed to participate in the same proximity service. In order for the proximity service to be provided, the two UEs may first need to be within a certain proximity threshold of one another (e.g. be in direct radio contact or have a certain maximum geographic separation). Determining that the two UEs support the same proximity service and are in proximity may be referred to as 'discovery' or 'discovery of proximity' or 'determining a state of proximity'.

In certain example implementations, generic expressions may be used and which may be structured in a standardized manner in order to categorize proximity services globally (e.g. by partitioning an expression into separate fields each identifying one category of proximity service).

In some example implementations, application specific expressions (IDs) may be used and which may be assigned by particular providers of proximity services and/or the like, and which in certain instances may not conform to any global scheme, etc.

Various techniques may be provided for use in obtaining and/or using expressions. By way of example, in certain instances, a specific proximity service (or type of proximity support) may be associated with a globally unique expression. In certain example implementations, Apps on a UE that support or make use of different proximity services may determine the expression that has been assigned (e.g. by a global standard or by a provider of proximity services) for each supported proximity service via (i) interaction with the user of the UE or (ii) interaction with some proximity related server or (iii) hard coding or otherwise providing the expression as part of the App.

In an example implementation, a user may interact with an App and a server and/or the like to select proximity support associated with finding a nearby restaurant, gas station, shop, etc. An associated expression or expressions may be provided by the server to the App (e.g., possibly with some limited lifetime after which the App may need to re-invoke the server to validate current expressions and/or possibly obtain new expressions). The App may then invoke proximity services (e.g., via interaction with a proximity engine on the UE and/or a remote proximity server in the serving wireless network). The App may provide the expressions obtained previously from the server to a local proximity engine and/or to a remote proximity server together with proximity related parameters (e.g., a maximum distance to define geographic proximity). The proximity engine and/or remote proximity server may then invoke standardized proximity support (e.g. as described later herein) to discover whether other UEs sharing the same proximity service(s) are in proximity and report back the identities and possibly the locations of any such UEs that share the same expressions that were found to be in proximity.

In certain example implementations, one or more operator centric expressions may be utilized. For example, it may be worthwhile to vest significant control over one or more expressions in wireless operators in order to bootstrap deployment of a workable system to support proximity services and discovery of proximity with low up front deployment and maintenance costs. To enable this, one or more generic expressions may, for example, be simplified and/or standardized, e.g., to support specific application specific IDs, etc. In certain instances, such a generic part (including possibly an operator ID) may be standardized to enable operator support of proximity category to expression mappings, e.g., down to a certain level. In certain instances, an application part may be defined by each operator and/or by the operators' clients. By way of a non-limiting example referred to herein as "example A", a possible standard may support different levels, such as, e.g., Level 1: proximity category (e.g. Retail, Online service); Level 2: proximity sub-category (e.g. Friend Finder); Level 3: Operator (which may instead be defined at level 1 and include country or region); Levels 4+: either standardized or operator defined. The resulting operator associated expressions may be more like other wireless network IDs, e.g. IMSI, MSISDN, public SIP URI, etc.

In certain example implementations, support of one or more expressions may be supported by multiple operators. For example, in certain instances, some clients (e.g., a search engine, a social network site, a department store, etc.) may obtain a single expression from just one operator for a particular proximity service. Such an implementation, may, for example, make use of support for roaming where an operator X provides support for proximity services for expressions assigned by another operator Y (e.g., and may bill operator Y for doing this).

In other instances, some clients may obtain a different expression from each of a number of different operators for the same proximity service. With this option, different expressions, or "aliases" may arise from different operators which may identify the same proximity service. Operator servers may, for example, store aliases assigned by other operators (assuming these are provided by the client Apps), e.g., to enable proximity discovery between UEs accessing different networks, and provide additional mapping support between proximity service names and expressions. In certain instances, client UEs and Apps may also be made aware of such aliases, e.g., in order to use the correct expression(s) in a serving network and to recognize expressions of interest for discovery. In a particular implementation, an expression (or expression set) may serve as a default in a network whose operator may not have assigned any expressions of its own to a particular client.

In accordance with certain aspects, techniques provided herein may support different business models and/or relationships. For example, in certain instances, operators may own an expression space assigned to them in a standard (e.g. Levels 4+ in the earlier example A), and may sell or lease all or possibly subsets of their expression space (either single expressions or a set of expressions) to their clients. By way of an example, a telecommunications company may be assigned an expression space E (worldwide or country/region specific). As such, the telecommunications company may sell or lease subsets E1, E2, E3 of E to a social network provider, a search engine provider, a news agency, respectively. Having purchased or leased subset E1, the social network provider may itself, in certain instances provide, sell or lease subsets E1-1, E1-2, E1-3, . . . of subset E1 to one or more App providers, users, user groups, etc.

In certain example implementations, one or more clients may be provided an opportunity to buy or lease expressions (e.g. as exemplified above) via online means, by telephone or through personal negotiation, etc. Operators may, for example, provide LTE-D support and/or the like for the expressions and expression subsets they sell or lease (e.g., as part of the sale or lease). As such, there may be no need initially for a complex global system of servers to assign, translate and support expressions. Instead each operator may, for example, provide its own server to support mappings, e.g., for its own expressions (and aliases).

A client who obtains sets or subsets of expressions by the above means may provide services to its own clients based on the expressions purchased or leased from operators. By way of a first example, a social network service and/or the like may enable users to setup, subscribe to and withdraw from user groups associated with a friend finder service and/or the like. For example, assume that a user group A currently comprises users A1, A2 and A3, and a user group B currently comprises users B1, B2 and B3. As such, a globally unique expression may be assigned to each group, e.g., Group A may be assigned expression EA, and Group B may be assigned expression EB. In order to discover one another, users A1, A2 and A3 may then broadcast their group expression (e.g., expression EA), and users B1, B2 and B3 may broadcast their group expression (e.g., expression EB). In a second example, a social network service and/or the like may enable users having a common interest (e.g., for gaming, antiques, art, motor bikes) to possibly set up, and/or subscribe to and withdraw from user groups associated with the common interest. Such user groups may then be assigned a group expression for broadcast during discovery. However, it may be beneficial for such discovery to be more selective than it might be with regard to a friend finder service, e.g., allowing users to hold back from being discovered.

In certain example implementations, it may be beneficial to provision one or more virtual UEs and/or the like. A virtual UE may be a network supported placeholder for a real UE without the need for actual physical deployment of a real UE. A virtual UE may be supported as logical entity in a network server or web server and may be assigned certain characteristics associated with a real UE and be enabled by the server to perform certain services and engage in certain communication normally supported by a real UE. Thus, a virtual UE may be assigned a specific (e.g. fixed) location, a specific UE identity and may be enabled to support certain proximity services. For fixed subscribers (e.g. a coffee shop, a hotel, an airport) with an interest in supporting certain proximity services, there may then be no need to deploy real mobile (or fixed) wireless terminals, which may simplify deployment by these types of clients by instead deploying one or more virtual UEs able to support the same proximity services. Network operators may then configure information about such virtual UEs and the proximity services they each support (e.g., expression(s), name, location, associated network cell(s), other meta-data, attributes, IP address, URL(s)) in one or more websites and/or the like. In certain instances, proximity to real UEs may still be determined (e.g. by a network proximity server with access to configured information for virtual UEs) based on the actual locations of the real UEs and the configured locations for the virtual UEs. Discovery methods that rely on comparing the locations of UEs may thus be usable if the locations of the virtual UEs are provided to real UEs by the network (e.g. via broadcast from base stations such as eNBs or by a proximity server) or if comparison of locations is performed in a network server with access to both the actual locations of real UEs and the configured locations of virtual UEs. One exception to discovery may be radio based D2D discovery which may not be possible since virtual UEs will not be able to send and receive signals to and from real UEs. Should proximity between a virtual UE and real UE be discovered (e.g., by the network or by the real UE), the network may provide associated meta-data including IP addresses and/or website URLs to real UEs discovered to be in proximity to virtual UEs. In certain instances, Apps or users for the real UEs may then interact with the discovered virtual UEs using the provided IP address and/or URLs. The interaction may appear to an App or user for a real UE as being the same as interaction with another real UE but may in fact be supported via interaction with a server or website acting on behalf of the virtual UE. Thus, for example, in certain instances an App or user for a real UE may not need to be aware whether another discovered UE is real or virtual.

Discovery and Prediction of Proximity

In accordance with certain aspects, the techniques provided herein may enable prediction of a geographic proximity between two or more UEs. In one example, a geographic proximity may be predicted for two UEs, at least in part, using current geographic locations and possibly current velocities of the two UEs to determine whether they are or may later be in proximity. Here, for example, two UEs designated UE A and UE B may be determined to be in geographic proximity if currently within 1000 meters of each other. In another example, UEs A and B may be determined to be in geographic proximity if currently within 1000 meters of each other and provided each UE is traveling at less than 5 meters/second. The conditions for determining geographic proximity may be defined by a network operator, a wireless standard or participating Apps and users—e.g. an App that supports or can be provided with a particular proximity service may define the conditions for its UE being in proximity to some other UE for this particular proximity service. In that case, different conditions may be defined in which geographic distance may be augmented with other conditions such as the current speed of each UE. Speed may be significant if there is no interest (e.g. by a participating UE) in discovering proximity to a fast moving UE that may not stay very long in proximity or whose user may not be in a position to communicate or affect a rendezvous with the user of another UE. Of course, these are also just a few examples and subject matter is not intended to be necessarily so limited.

In certain instances, a predicted geographic proximity may be based, at least in part, on one or more probable future locations (and possibly future velocities) of two UEs to determine whether proximity is likely to occur within some time span (e.g., within the next hour, etc.). A probable future location may be determined in a variety of ways. For example, in certain instances a probable future location may be determined, at least in part, by extrapolating current and past motion of a UE to predict its location (or area or volume within which it should be located) at some future time. In another example, in certain instances a probable future location may be determined, at least in part, based on known past behavior of the user, e.g., in association with a current location, a current day and time, etc. For example, known past behavior of a user may indicate that the user is likely to be at home, in a restaurant, at a shopping mall or at a workplace at certain times and on certain days. For example, known past behavior of a user may indicate that the user is likely to exhibit certain habits while visiting a certain location such as a shopping mall, park or sports arena, e.g., possibly after having driven into an adjacent parking lot or parking garage and parked near a particular entrance, etc. In another example, known past behavior of a user (e.g. as implied by a location history for the UE that may be stored in the UE or in a network location server or network Proximity server) may indicate that the user is likely to move some significant distance away from and then back to a certain location (e.g. in order to take a daily walk or jog) at a certain time each day, e.g., possibly along one of a small number of different routes which may be distinguished by the user's heading and location soon after starting. In still another example, known past behavior of the user may indicate that the user is likely to move from location to another (e.g. in order commute to or from work or to visit a friend or relative from the user's home or workplace) on certain days and/or at certain times, e.g., possibly using the same route and/or traveling at about the same speed each time. Again, as with all of the examples herein, claimed subject matter is not intended to be necessarily so limited. Based on one or more of the current and past location and velocity of each UE and any known past location history of each UE, either of the UEs or a network location server may be able to predict that the two UEs may be in proximity after some time interval with some probability and may be able to estimate the time interval and the probability (e.g. at least coarsely). If the time interval is less than (or falls below) some threshold and/or if the probability is greater than (or exceeds) some threshold, an application on each UE or the user of each UE may be informed that both UEs are or may later be in proximity.

Figure 2:
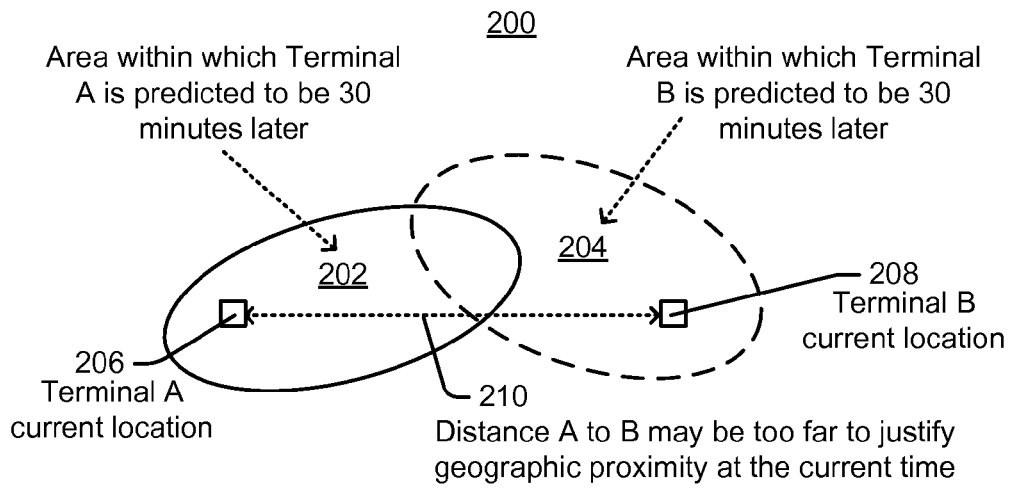
FIG. 2 is an illustration showing an example arrangement wherein a state of proximity may be determined to exist between certain mobile devices based, at least in part, on distance and/or other geographic consideration(s), in accordance with an example implementation.

FIG. 2 shows an example arrangement 200 of two terminals comprising terminal A 206 and terminal B 208. The current distance 210 between terminals A and B may be too great to consider terminals A and B as being currently in proximity to one another. However, it may be possible for terminal A and/or terminal B or a serving network (e.g. network 130) or network server (e.g. server 140, 150 or 155) to predict that terminals A and B may later be in proximity based on their probable future locations. For example, area 202 may represent an area within which terminal A 206 may be predicted to be within at some future time (e.g. 30 minutes later) based on such factors as the current location of terminal A, the current velocity of terminal A, the recent movement history of terminal A and/or known past behavior of terminal A when at or nearby to its current location and/or at the current time on previous days and/or on the same day of the week on previous weeks. Similarly, area 204 may represent an area within which terminal B 208 may be predicted to be within at the same future time (e.g. 30 minutes later) based on the same or similar factors applicable to terminal B to those mentioned above for terminal A. The two predicted areas 202 and 204 may overlap as illustrated in FIG. 2 or may not overlap but be close to one another (not shown in FIG. 2). In particular, there may be many locations in area 202 that are in proximity to many other locations in area 204 due to being within a required maximum distance for considering two terminals to be in proximity. Accordingly, it may be predicted that terminals A and B may be in proximity to one another at a later time (e.g. 30 minutes later). While the prediction may not associate a probability of 100% of proximity occurring, it may be possible to determine a lower probability for the occurrence of proximity (e.g. based on the extent to which areas 202 and 204 overlap or the mean proportion of area 204 that is in proximity to any random location in area 202). If this lower probability is not insignificant (e.g. is 20% or higher), a state of proximity may be predicted (e.g. by terminal A, terminal B, a serving network or a network server) for a later time (such as 30 minutes later). Furthermore, when proximity is predicted to occur at some future time (e.g. 30 minutes later) with some probability, the proximity (if it occurs) may actually begin to occur at an earlier or later time than that predicted meaning that prediction may at best indicate a likelihood of proximity occurring but not an exact time when it will occur. The predicted proximity may then be indicated at the current time (e.g. 30 minutes before the proximity may occur) to one or more applications on terminals A and B and/or to the users of terminals A and B in the case that applications or users have an interest in receiving or performing some common proximity service. The indication of predicted proximity may also include the fact that proximity is predicted and not current or may not include this information to simplify interaction with applications and users and reduce the complexity of any response from applications or users.

For some proximity services (e.g. friend/relative finder) it may be an advantage to inform one or both terminals of imminent proximity before it actually occurs, e.g., so that one or both users may adjust their movements to meet up, etc. Proximity may thus be indicated, based on a prediction, before it actually occurs. A prediction may make use of the location history of each terminal, which in some implementations may be stored only in the terminal (e.g., for privacy) or in other implementations may be stored in a network server with an understanding that the location history is generally or only to be used to provide or enhance service provision to the terminal's user. In certain instances, to make use of such techniques, terminals may be informed of the locations of other terminals, possibly even when outside normal proximity bounds to allow any terminal to compare both its current location and predicted future locations with the current locations of other terminals and determine whether proximity may occur in the future.

It should be noted that the type of prediction described in association with arrangement 200 in FIG. 2 may only be possible in an optimum manner in a network or network server. If prediction is performed by a terminal—e.g. by terminal A 206 or terminal B 208 in FIG. 2—the terminal may only be in possession of its own location history but not the location history of the other terminal for reasons of privacy. Thus, for example, terminal A 206 may be able to determine the area 202 for its own future location with some reliability but may only determine the area 204 for the future location of terminal B 208 with lower reliability due to basing this only on the current location (and possibly current velocity) or terminal B but not any previous location history for terminal B. However, even this more limited capability may be useful—e.g. if the area 202 for the predicted future location of terminal A overlaps the current location of terminal B, terminal A may predict that proximity between terminals A and B will be possible.

Figure 3:
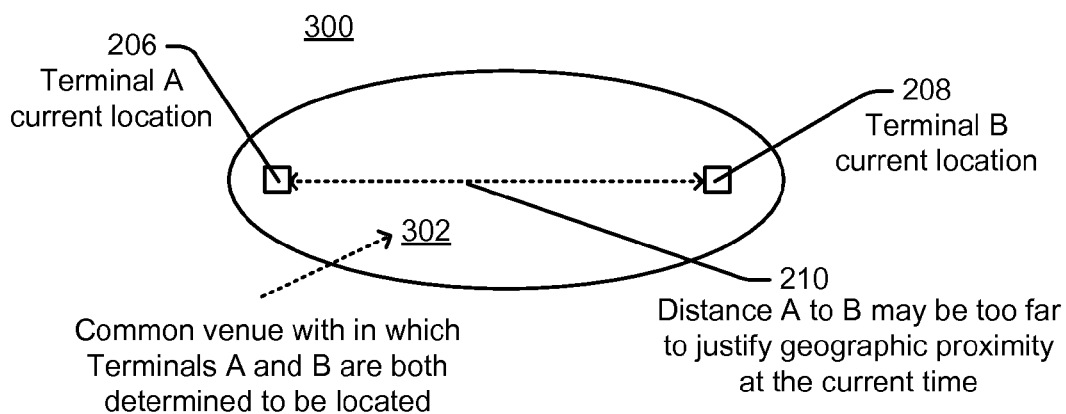
FIG. 3 is an illustration showing another example arrangement wherein a state of proximity may be determined to exist between certain mobile devices based, at least in part, on map and/or context consideration(s), in accordance with an example implementation.

FIG. 3 is an illustration showing yet another example arrangement 300 wherein a state of proximity may be determined to exist between certain mobile devices (represented by terminals A 206 and B 208) based, at least in part, on map and/or context consideration(s), in accordance with an example implementation. For example, a venue based proximity may be determined. Here, for example, area 302 may represent a common venue within which terminals A 206 and B 208 may both be determined to be located. In certain instances, terminals that may be in the same venue may be considered to be in proximity even though a current distance 210 between them may be too large to justify a normal (e.g., threshold-based) geographic proximity. Examples of venues may include: a shopping mall, a sports stadium, a convention center, a hospital, an airport, a railway station, an office building, a museum, a tourist site, etc. In certain instances, a venue may even be quite large, e.g., a park or a national park, and/or the like.

In example arrangement 300, even though terminals A 206 and B 208 are currently too far apart to be considered to be within geographic proximity, their location in the same venue may justify alerting one or both of the terminals to being in a venue based proximity.

Determining that a terminal is within a particular venue may be done by the venue itself. For example: WiFi access points, base stations or femtocells belonging to the venue may detect the presence of terminals within the venue (e.g. when a terminal attaches or registers for wireless service or simply transmits an identification such as WiFi MAC address as part of normal wireless operation). Alternatively or in addition, a location server belonging to the venue may periodically identify and locate terminals as being within the venue using network based positioning with minimal terminal support and/or may locate a terminal (e.g. with terminal support) whenever an App on the terminal or the user requests some service from the venue (such as directions or a map), In addition, terminals passing quickly through or past a venue (rather than staying within the venue) may be excluded by examining recent location and velocity history in which terminals only temporarily within the venue may be identified from a high sustained velocity or a location history that only temporarily intersects the geographic area of the venue.

In certain implementations, a determination of venue based proximity may be supported by the venue itself (e.g., by some server belonging to the venue, etc.) if users and their associated proximity requirements are known to the venue (e.g. via some previous registration of a terminal with the venue). Alternatively, once terminals discover being in a venue (e.g. from information provided point to point or by broadcast by the venue), the venue information may be added to location information in the terminal to enable proximity determination by a terminal or by some proximity supporting server in a serving wireless network.

Once two terminals A and B are discovered to be in the same venue—e.g. by the terminals or by a network proximity server—the users of the terminals and/or one or more applications on each terminal may be notified if the users or applications for both terminals support or have an interest in the same proximity service(s). The notification may just indicate that proximity was discovered or may provide an indication that proximity was discovered due to being in the same venue. In the latter case, the users or applications can be aware that the terminals (and users) may not necessarily be sufficiently close to qualify for being in normal geographic proximity.

Near Proximity

Figure 4:
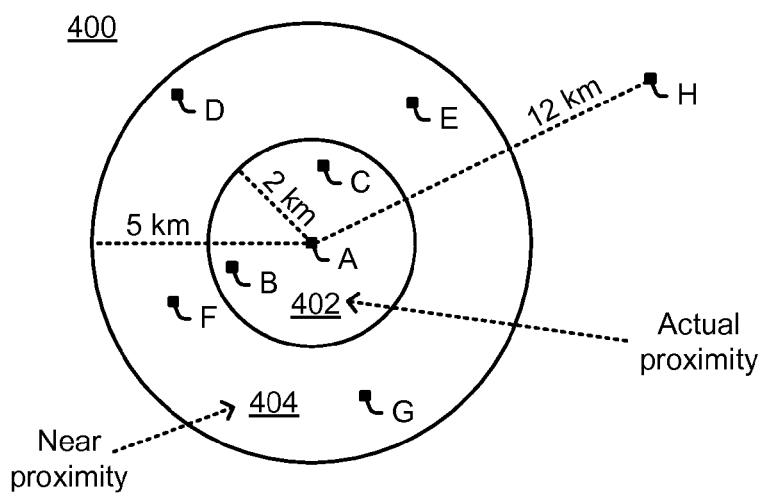
FIG. 4 is an illustration showing still another example arrangement wherein various states of proximity may be determined to exist between certain mobile devices, in accordance with an example implementation.

In certain implementations, a distinction may be made between near proximity and actual proximity. By way of example, FIG. 4 is an illustration showing an example arrangement 400 (not drawn to scale) wherein various states of proximity may be determined to exist between certain mobile devices, in accordance with an example implementation. Here, mobile devices are represented by terminals A, B, C, D, E, F, G, and H, each illustrated as being dispersed within arrangement 400 at different locations. For example, terminals A, B and C are within a first area 402 (e.g., a circle with a radius of 2 km, centered at the location of terminal A). For example, terminals D, E, F, and G are within a second area 404 (e.g., an annulus with a circular outer radius of 5 km and a circular inner radius of 2 km, both centered at the location of terminal A). Additionally, terminal H is shown as being located at a distance of 12 km from the location of terminal A outside of both first area 402 and second area 404.

In certain instances, terminals are considered to be in near proximity if determined to be too far apart to qualify for actual proximity (e.g., threshold based) but near enough together that actual proximity may occur after some short period of time (e.g. within the next hour). In certain instances, being in near proximity may be associated with a distance threshold (e.g. the outer radius in FIG. 4) that exceeds a distance threshold for actual proximity (e.g. the inner radius in FIG. 4). In certain instances, for terminals in near proximity, direct radio contact and radio discovery may not be possible or may be possible but with a signal level less than a required minimum threshold, however, e.g., due to relatively large separation distances. Likewise, in certain instances a maximum threshold on distance to qualify for being in geographic proximity may be exceeded. Arrangement 400 shows, for example, that terminals B and C may be in actual geographic proximity to terminal A while located within first area 402 (e.g., applying a threshold distance/range of 0-2 km). Terminals D, E, F and G may be in near proximity to terminal A while located within second area 404 (e.g., applying a threshold distance/range of 2-5 km). Terminal H may be determined to be in neither actual nor near proximity to terminal A (e.g., due to exceeding the example threshold distances/ranges). Of course, these are just a few examples and subject matter is not intended to be necessarily so limited.

In certain implementations, near proximity may not need to be accurately determined because users and Apps may not be informed about it. For example, if near proximity has a maximum distance threshold of 5 km and a minimum distance threshold of 2 km as in the previous example, it could suffice to determine near proximity when the distance was known only to be in the range 0-10 km. This means that approximate terminal locations may be used to discover near proximity, e.g., locations determined from the terminal's current serving cell or current network area (such as a tracking area in the case of an LTE network or a location area in the case of a WCDMA or GSM network) or from some previously determined (and possibly no longer current) location, speed and heading. In certain implementations, near proximity may be used to assist discovery of actual proximity, e.g., on a periodic or other basis.

In certain example implementations, a network server and/or terminal A may periodically or at various times scan using a scan method M1 and scan rate (or scan frequency) R1 for other terminals to determine which ones may be in near proximity to the terminal A. In certain instances, a network server and/or terminal A may periodically scan the terminals already found to be in near proximity (and optionally already in actual proximity) to the terminal A, e.g., using a scan method M2 and scan rate (or scan frequency) R2 to determine which of these terminals may (or may still) be in actual proximity to terminal A. The scan rates R1 and R2 may correspond to the frequency with which scan methods M1 and M2 are used by a network server and/or terminal to determine a state of near proximity and actual proximity, respectively, between a pair of terminals.

By way of example, the scan method M1 may be simple and efficient and the scan rate R1 may be low (e.g., one scan every 15 minutes). Scan method M1 may, for example, consider all terminals that use the same proximity services as terminal A and that may be nearby to terminal A, e.g., which may (at times) comprise a large number of terminals. An example scan method M2 may be more complex, e.g., possibly more accurate and less efficient than method M1, and the scan rate R2 may be relatively higher (e.g., one scan every 5 minutes). Scan method M2 may, for example, consider terminals already discovered to be in near proximity to terminal A (e.g., via scan method M1). As such, the number of such terminals scanned by method M2 may be significantly reduced (e.g. much less than the number of terminals scanned by method M1) and may even be zero at times. Since method M2 may scan a relatively smaller number of terminals, it may be more complex than method M1 and hence possibly more accurate without requiring significantly more processing and storage resources than method M1. By way of a further example, method M1 may consider or otherwise make use of information indicative of a serving cell, a tracking area in the case of LTE, a previous (possibly no longer current) location estimate, visible WiFi APs, and/or the like or some combination thereof. By way of example, method M2 may additionally or alternatively consider or otherwise make use of information indicative of a current geographic location, measured RTT between 2 terminals, a direct radio detection, and/or the like or some combination thereof. By way of example, method M1 may be similar to or the same as method M2 but may use fewer resources than M2 due to employing coarser location accuracy and/or lower scan rate R1.

In certain example implementations, a network proximity server may be used to discover proximity and near proximity between pairs of terminals. The proximity server may exchange information with terminals via a control plane or user plane based solution. With a control plane solution, signaling to support discovery of proximity (e.g. signaling between the proximity server and any terminal and signaling between the proximity server and other network elements) may mainly make use of existing network interfaces and protocols. With a user plane solution, signaling between the proximity server and any terminal and possibly signaling between the proximity server and other network elements may be conveyed as data by intermediate entities (e.g. using TCP/IP or UDP/IP protocols). Additional aspects of proximity servers and control and user plane solutions are described later herein—e.g. in association with FIGS. 7, 9, 14, 15 and 16. When a control plane proximity solution is used by an LTE network, all or some of the following information may be used to maintain near proximity information for terminals in a proximity server: (i) current tracking area of each UE when in idle mode as known to the serving MME for the UE; (ii) current serving eNB of each UE when in connected mode as known to the serving MME; (iii) proximity services used by (or of interest to) each UE—e.g. as denoted by a unique expression assigned to each proximity service—and as provided by the UE to the MME (e.g. on network attachment) and/or as provided by the UE's HSS to an MME when the UE attaches; and/or (iv) periodic location estimates for a UE, provided by the UE (e.g. when a Tracking Update occurs) or obtained by the network (e.g. instigated by a serving MME or a proximity server).

In certain example implementations, if a network proximity server is used with a user plane proximity solution, UEs may periodically update the proximity server with the following: current serving or camped on cell ID; approximate or accurate UE location; and/or proximity services used by (or of interest to) each UE—e.g. as denoted by a unique expression assigned to each proximity service.

In certain instances with either a control plane or user plane proximity solution, a proximity server may use received information (e.g. as exemplified above) to create, update and maintain a list of other terminals in near proximity to any particular target terminal, e.g., for a proximity service common to such terminals. By such means, a network proximity server may establish and maintain a list of other terminals that are in near proximity to some other target terminal with respect to one or more or more proximity services of common interest to the target terminal and the terminals in near proximity.

If discovery of actual geographic proximity is desired for some terminal A, a network proximity server may, for example, obtain accurate location information to verify which terminals (that may have already been discovered to be in near proximity to the terminal A) may be in actual geographic proximity to terminal A. In certain implementations, terminals may be located by a network (e.g. using SUPL or a control plane location solution), e.g., on a periodic basis. In certain implementations, terminals may be instructed to listen for other terminals and measure and provide the RTT between them. The terminal locations and/or RTT values may be used to calculate the current distance between terminal A and each terminal that is in near proximity to terminal A in order to determine which terminals in near proximity are currently in actual proximity to the terminal A.

In certain example implementations, should actual radio proximity be desired to be determined rather than geographic proximity, terminals in near proximity may be instructed to enter radio discovery mode, e.g., in which each terminal may periodically broadcast and/or listen for broadcasts from other terminals. In certain instances, a server may identify or provide characteristics (e.g., signal characteristics) for the other terminals (in near proximity to a terminal A) to any terminal A to possibly make listening by terminal A more efficient. In certain instances, terminals may be switched out of radio discovery mode when not needed (e.g. if there are no other terminals in near proximity) to possibly save on battery as well as radio and processing resources.

In certain example implementations, techniques may be implemented to support inter-network discovery of near proximity in which terminals served by different networks may be discovered to be in proximity. For example, in certain instances, terminals may be enabled to discover terminals accessing other networks that share common proximity services, e.g., by extending some of the concepts described previously regarding near proximity and actual proximity. Networks (e.g. network proximity servers belonging to different networks) may, for example, exchange information regarding near proximity which may comprise: an identification L of a location point or location area or volume which may be a coarse location; and/or an identification P of each proximity service used by at least one terminal that may be present near or within the given location, area or volume L. In certain instances, an identification L may refrain from referring to cells, network areas (e.g. LTE tracking areas), and/or the like, since such information may be specific to a particular network and may be confidential and not known to other networks. Instead, an identification L may, for example, be defined using standard location coordinates (e.g. lat/long) or using some agreed to set of geographic location areas common to two or more networks such as location areas defined by a grid system (e.g. a rectangular grid made up of 200×200 meter cells where each cell has a unique label which is used to define L and is known to all participating networks). A network (server) N1 may, for example, then transfer to another network (server) N2 a list of locations L1, L2, L3 . . . and for each location Li, may transfer a list of one or more proximity services Pi1, Pi2, Pi3 . . . supported by terminals currently served by network N1 that may be inside, at or nearby to location Li. A network (server) N2 may, for example, use received information from network N1 to determine whether any of network N2's terminals that share the same proximity service(s) (Pi1, Pi2 etc.) may be in proximity or near proximity to terminals in network N1 As an example, network N2 may assume near proximity for any proximity service Pm reported by network N1 for any location (area or volume) Ln if one or more of network N2's terminals subscribing to (or supporting or having an interest in) Pm may be at, in or nearby to Ln since terminals from both networks N1 and N2 with an interest in a common service Pm would then be in, at or nearby to the same location Ln. The discovery of near proximity in this case may just be limited to a knowledge by each network (or each network proximity server) that for a certain coarse location L, some terminals served by the network at, in or nearby to location L are in near proximity to certain other terminals in another network for certain proximity services. While each network (or network server) may know which of its own terminals are in near proximity to one or more other terminals served by the other network, it may not know the identities of these other terminals since they may not have been transferred by the other network (or network proximity server). While this information limits discovery of actual proximity (without additional information transfer such as that described later herein), it may also indicate large numbers of terminals in a network for which near proximity to terminals in another network has not occurred. The network may then be spared from attempting to discover actual proximity for these terminals which may save significantly on processing and signaling usage and thereby enable faster discovery of actual proximity for terminals for which near proximity was first established.

In certain example implementations, techniques may be implemented to support inter-network discovery of actual proximity. For example, in certain instances, information exchanged between networks (or network proximity servers) to discover near proximity may be limited to just coarse locations and associated proximity services and sent infrequently (e.g. every 10 minutes) as described previously, possibly making support efficient. If near proximity is discovered between terminals in two networks for some proximity service P at or nearby to a location L, each of the two networks may, for example, then send to the other network the identities and locations of its own served terminals that subscribe to or make use of service P that may also be at or nearby to location L. Each network (or a proximity server in each network) may then, for example, compare locations for terminals that use the same proximity service P to determine which terminals may be in actual proximity. In certain instances, information to discover actual proximity (such as terminal identities and terminal locations) may be exchanged more often between networks (or between network proximity servers) than information that is exchanged to discover near proximity, and may only need to refer to terminals already discovered to be in near proximity. Although more detailed information may then be exchanged more often to enable discovery of actual proximity than to enable discovery of near proximity, the restriction of the detailed information just to terminals already known to be in near proximity may limit the quantity of information compared to what would be needed if the information were to be sent for all terminals served by a network.

If a network N1 (or a network proximity server in network N1) may be able to reliably verify (e.g. authenticate) the proximity services used by each of its own served terminals, the terminal identities transferred to another network N2 (or to a proximity server in network N2) may be the real ones (e.g. may include a global identity of each terminal such as a public user ID). These terminal identities may then be provided to other terminals served by network N2 (e.g. by a proximity server in network N2) along with the proximity services used by the terminals in network N1 after proximity is discovered between pairs of terminals in networks N1 and N2. In this case, a terminal served by network N2 that receives the identity of another terminal served by network N1 that is in proximity to the terminal in network N2 can be sure that the proximity services supported or used by the terminal in network N1 are valid and can then decide how to react to the reported proximity. Since the identity of the terminal in network N1 reported to the terminal in network N2 would be a real identity, the terminal in network N2 would be in a position to instigate communication with the terminal in network N1 if this was required or useful to support the proximity service(s) for which proximity had been discovered.

If radio and not geographic proximity needs to be discovered, the preceding method of discovering near proximity between terminals in different networks may continue to be used but discovery of actual proximity for terminals already discovered to be in near proximity may be based on an ability to receive signals (e.g. with a strength greater than some threshold) transmitted by one terminal in one network to another terminal in another network rather than on verifying a particular maximum geographic separation. A network N1 (or a proximity server in network N1) may then, for example, provide another network N2 with characteristics of signals broadcast by terminals in network N1, e.g., to possibly allow easier acquisition by terminals in network N2 that are in near proximity to terminals in network N1. In certain instances, network N1 may assign frequency or frequency resources (e.g., that network N1 owns) to terminals served by network N2 (e.g. to terminals in network N2 that are in near proximity to terminals in network N1) which the terminals in network N2 may use to broadcast their presence to terminals in network N1.

In certain example implementations, techniques may be implemented to support notification of proximity to Apps and/or users. Assuming that two terminals, e.g., T1 and T2, are discovered to be in actual proximity for a particular proximity service, these terminals may be notified in the case that proximity is discovered by a network or by a network proximity server. For example, a network proximity server may convey to terminal T1 the identity of terminal T2 and the particular proximity service for which proximity was discovered. Similar information may also be conveyed to terminal T2. In the case that proximity has been discovered by one or both terminals instead of (or in addition to) by the network (e.g., using direct radio signaling between the terminals or by having signals from one terminal relayed to the other terminal via one or more other intermediate terminals), the information on terminal identities and proximity services may already be known to the terminals (or to some proximity engine or process running on each terminal) due to having been included in the signals sent from one terminal to the other. For both the network discovery and terminal discovery cases, one or more applications on the terminals supporting the particular proximity service(s) may be informed of the discovered proximity (e.g. may be provided with the identity of the other terminal discovered to be in proximity or provided with a means to communicate with this other terminal) and/or the terminal user(s) may be informed accordingly. Subsequent behavior may be up to the Apps and/or users and may include, for example, different types of communication (e.g. speech, video, IM, data) or possibly no noticeable action (e.g. where users or Apps simply take note of the proximity but defer any action to a later time, possibly when some other trigger event has occurred). In certain instances, a proximity process or proximity engine on a terminal may continue to monitor proximity and inform Apps and/or users when proximity to some other terminal for some proximity service has ceased, e.g., such an occurrence may trigger one or more other actions from the Apps and/or users.

Broadcast and Relaying

In certain example implementations, techniques may be implemented to support proximity services without network support—e.g. when terminals are outside of network coverage or when network support is not available or cannot be relied upon. For example, if proximity services are supported by terminals without the assistance or participation of either a network or network based proximity server, terminals may employ direct radio discovery. In certain instances, terminals whose broadcast signals may be directly received by some other terminal A may be considered to be in actual proximity to terminal A (e.g., either without condition or if the received signals satisfy certain conditions). Here, for example, a condition may be satisfied if a signal level exceeds some threshold and/or if the measured RTT between the terminals is below some threshold. Terminals whose signals may not be received directly by terminal A (Group 1) or whose signals may be received but fall below the required threshold(s) for actual proximity (Group 2) may be candidates for near proximity. For terminals in Group 2, a determination of actual rather than near proximity may be based, at least in part, on monitored signal levels and/or RTTs. For terminals in Group 1, a determination of near proximity to terminal A may, for example, be possible if each terminal T in Group 1 relays to other terminals, by means of broadcast, information on all terminals whose signals have been directly detected by the terminal T. For example, terminal A may then receive from those terminals B it is in direct contact with information on other terminals C in direct contact with terminals B but not in direct contact with terminal A. Terminals B may, for example, also relay information on additional terminals D not directly detected by terminal B but identified via broadcast from other terminals (e.g. terminals C). Terminal A may thus receive information on all terminals whose information can be sent to terminal A either directly (as in the case of terminals B) or via relaying through other terminals (as in the case of terminals C and D). Information broadcast by or relayed for other terminals may, for example, be indicative of their identities, location information (e.g., RTTs to other terminals and/or location coordinates), and/or their supported proximity services, just to name a few examples. In certain instances, terminal A may end up receiving information on all terminals and, by using the received location information, may be able to determine which terminals may be in near proximity to terminal A. In certain instances, terminal A may listen for direct radio signals from terminals found to be in near proximity to terminal A in order to determine which of these terminals may be in actual proximity to terminal A and/or may use received location information to determine when any of these terminals may be in actual proximity to terminal A.

In certain example implementations, relaying of information by terminals may have some limitations. For example, in certain instances, unless a terminal is surrounded by many terminals in different directions, information on some terminals in near proximity may not be relayed. As such, in certain implementations, a terminal may need to listen for direct broadcasts from terminals not so far detected, in order to detect early on when they are in actual proximity. In certain instances, relaying of information may consume significant bandwidth and/or possibly be redundant (and possibly wasteful of resources), e.g., whenever information on the same terminal is relayed to a terminal A by more than one neighbor terminal or by the same neighbor terminal multiple times. This may not always be important, however, when terminals are out of network coverage because bandwidth may be plentiful (e.g. due to no interference with network used bandwidth). In certain implementations, the consumption of bandwidth may be mitigated by relaying information periodically at low frequency, e.g., every 5 minutes. In certain instances, the discovery of near proximity for the case of no network support may be used to support group communications wherein being in near proximity may trigger relaying of communication between terminal users.

Figure 5:
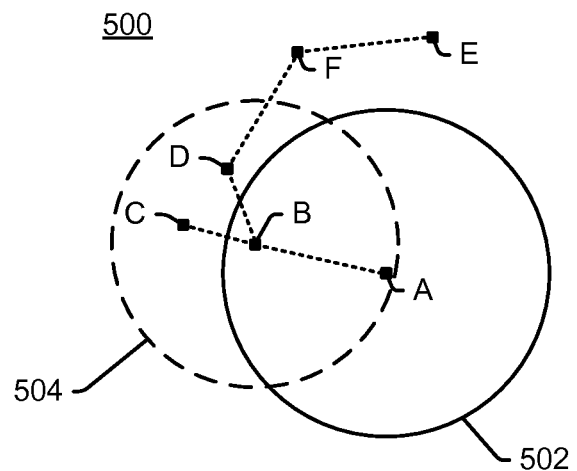
FIG. 5 and FIG. 6 are illustrations showing some example arrangements of mobile devices supporting the transmission and/or relaying of information for use in determining a state of proximity between two or more of the mobile devices, in accordance with an example implementation.

FIG. 5 is an illustration showing an example arrangement 500 of mobile devices (terminals A, B, C, D, E, and F) supporting the transmission and/or relaying of information (e.g. for use in determining a state of proximity or for supporting a certain proximity service) between two or more of the mobile devices, in accordance with an example implementation. Area 502 represents a limit of direct radio reception for terminal A, and area 504 represents a limit of direct radio reception for terminal B.

In this example, terminal A directly detects the presence of terminal B (from signals broadcast from terminal B) and can learn about terminal C and terminal D from information relayed by terminal B. However, there may be no terminal within radio coverage of terminal A that can relay information received directly from terminal E and terminal F even though these may be in near proximity to terminal A. However, terminal E may broadcast information to terminal F which may broadcast its own information and relay terminal E's information to terminal D which may in turn relay this information to terminal B and thence to terminal A. Relaying may, for example, thus transfer information concerning each terminal to all other terminals. Relaying information within a set S of terminals in the above manner may be possible unless the set S contains 2 or more subsets S1, S2 (, S3 . . . ) with each terminal in any subset Si being out of radio range of every terminal in every other subset Sj.

In certain example implementations, a method of relaying information among a set of terminals without network support may be for every terminal A to broadcast information for every other terminal B whose information is received either directly from the terminal B or via relaying from some other terminal C. This may result in each terminal in any set S of terminals broadcasting information for every other terminal in S provided no subset of S is out of radio range of any other subset of S. This may, for example, produce unnecessary broadcast (and unnecessary extra use of bandwidth) as well as continuing to propagate out of date information (e.g. location information) for some terminals. To reduce unnecessary broadcast and/or avoid out of date information, in certain instances information on each source terminal may be tagged by the source terminal in some manner, e.g., explicitly with a version number V or timestamp TS and implicitly or explicitly with a duration D (where an implicit duration D could be a system parameter configured in all terminals). In certain implementations, a terminal T1 receiving information for a terminal T2 may only accept the information if the associated version V or timestamp TS is higher than or later than the version or timestamp, respectively, for any other information for terminal T2 received previously by terminal T1—otherwise the newly received information may be ignored. If terminal T1 receives new (higher version or later timestamped) information for terminal T2, it may broadcast the new information for the duration D and may thereafter discard the information. A version V or timestamp TS used to tag information for any source terminal may, for example, be incremented by the source terminal even if there is no change in the information, e.g., to ensure other terminals know the unchanged information is still up to date.

Figure 6:
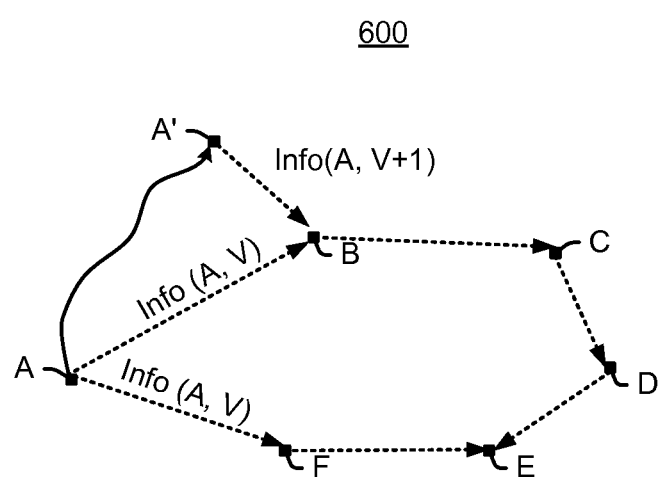

FIG. 6 is an illustration showing an example arrangement 600 of mobile devices (represented by terminals A, B, C, D, E, and F) supporting the transmission and/or relaying of information as described above between two or more of the mobile devices, in accordance with an example implementation. Here, terminal A is shown as being moved at some stage to a new location wherein terminal A is represented as A' at the new location. In this example, terminal E may receive information related to terminal A both via relaying through a chain of terminal B, terminal C, terminal D which involves transmission of information on 4 consecutive hops and via relaying by terminal F which involves transmission of information over only 2 consecutive hops. Hence, the information relayed by terminal F may arrive first (since there are fewer hops to delay the information) so terminal E may ignore the same information when received from terminal D. Suppose after some time period, terminal A moves (to A') and is still within radio range of terminal B but out of radio range of terminal F. If terminal A broadcasts new information (e.g. information containing its new location) with a new version V+1, terminal E may now accept the new information from terminal D (due to the higher version V+1) and may ignore any out of date information broadcast by terminal F which may still indicate version V. In addition, terminal F may accept the new information from terminal E, e.g., once terminal E starts to broadcast such new information.

In certain example implementations, techniques may be implemented to support efficient relaying of information among terminals without network support via means of acknowledgment(s). In certain example implementations, a terminal T1 may stop broadcasting or relaying certain information (I) once it knows that all interested terminals within direct radio range of T1 already have the information I. Another terminal T2 may, for example, effectively confirm receipt of I to terminal T1 via either explicit or implicit acknowledgment. By way of example, with an explicit acknowledgment, terminal T1 may observe terminal T2 broadcasting the same information I. For example, assuming I relates to some terminal T3, I can be uniquely labeled using some identifier for terminal T3 plus an information version V or timestamp TS assigned originally by terminal T3. For explicit acknowledgment of I, terminal T1 may observe terminal T2 broadcasting information for terminal T3 (e.g. labeled with the identifier for terminal T3) and with the same version V or timestamp TS that terminal T1 already has).

In certain instances, with implicit acknowledgment, terminal T1 may broadcast I together with a tag value TV unique to T1 (e.g., which may comprise the ID of terminal T1 plus a sequence number assigned by terminal T1). Any terminal T2 that receives I together with TV directly from terminal T1 may include TV in all broadcasts of its own and continues broadcasting TV so long as it receives I together with TV from terminal T1. However, TV may not be relayed when I is received together with TV from a terminal that is not terminal T1. Terminal T1 may continue to broadcast TV (or an updated version of TV) along with I, e.g., so long as I is broadcast. If terminal T1 observes terminal T2 broadcasting TV (or an updated version of TV), it may determine that terminal T2 has received I. In certain instances, TV may also be used by terminal T1 to tag other information items J broadcast or relayed by terminal T1. In some implementations, TV may be quite short (e.g. much smaller than the information I that TV is used to tag) and may thus be a more efficient means of acknowledging I than broadcast of I itself. Once all terminals from which terminal T1 may receive broadcast directly have explicitly acknowledged I (e.g. via broadcast of I) or implicitly acknowledged I (e.g. via broadcast of a tag value TV), terminal T1 may stop broadcasting or relaying I.

In certain instances, such explicit and implicit acknowledgment mechanisms as those described above may allow more efficient broadcasting and relaying. In an example implementation, a terminal T1 may initially broadcast any updated information I1 for itself and may include a higher version number V1 or later timestamp TS1 for I1. Terminal T1 may, for example, likewise relay any updated information I3 received for another terminal T3 as indicated by a higher version V3 or later timestamp TS3 (assigned by terminal T3) than previously received for terminal T3 by terminal T1. Once all other terminals S from which terminal T1 receives broadcasts directly have explicitly or implicitly acknowledged I1 and/or explicitly or implicitly acknowledged I3, terminal T1 may cease broadcasting I1 and/or cease relaying I3 in each case respectively (e.g. in the case of I3, terminal T1 can then ignore I3 when received from other terminals). In certain instances, terminal T1 may resume broadcast of I1 or resume relay of I3 if I1 is updated or terminal T1 receives a newer version of I3 (with a higher version V3+n or later timestamp TS3+x) in each case respectively. Terminal T1 may then wait until the new information is acknowledged implicitly or explicitly by all terminals in direct radio range before ceasing broadcast or relaying. Terminal T1 may also resume broadcast of I1 or resume relay of I3 if T1 receives a direct broadcast from a new terminal not in the previous set S that does not contain (or implicitly acknowledge) I1 or I3, respectively, or contains an earlier version of either information. Terminal T1 may then wait until the new terminal explicitly or implicitly acknowledges I1 or I3 (in each case respectively) before ceasing broadcast or relaying.

The previous mechanism may not guarantee that a terminal T1 will always receive an acknowledgment from another terminal T2 for information I broadcast or relayed by T1. There may be cases where terminal T2 has I and either (a) does not receive terminal T1's broadcasts directly or (b) observes terminal T1 broadcasting I and concludes that because terminal T1 (and all other terminals in range of terminal T2) has (have) I, terminal T2 does not need to send I. Case (b) above may be avoided if terminal T1 employs implicit acknowledgment because terminal T2 may still have to broadcast any tag value TV sent by T1 in association with I which will then implicitly acknowledge I to terminal T1. For case (a) above, terminal T1 may observe terminal T2 not broadcasting I and conclude terminal T2 does not have I, leading terminal T1 to keep sending I. Case (a) may be fairly rare because it depends on unsuccessful terminal T1 to terminal T2 transmission and successful terminal T2 to terminal T1 transmission, but may be possible due to different transmission powers and receiver sensitivities in terminal T1 and terminal T2. To mitigate case (a), in certain instances a terminal may periodically resend any information I even when all terminals in direct radio contact appear to have acknowledged I. In the example above, this would lead terminal T2 to periodically resend I and therefore confirm receipt to terminal T1 enabling T1 to cease sending I. In addition whenever information I changes, terminals may send the newer version of I which will terminate transmission of the older version of I in terminals such as terminal T1 above.

Reference is now made to FIG. 20, which is a flow diagram illustrating a process 2000, which in accordance with certain example implementations, may be implemented to support all or part of an example general broadcast and relaying method among terminals without network support. In support of such a method at example block 2002, each terminal may start by periodically broadcasting information for itself comprising and/or other indicating, for example, its identity, current location and supported proximity services and an information version or timestamp. Each terminal may also listen at example block 2004 for broadcasts from other terminals (e.g. when not engaged in performing block 2002) and may store any information received from other terminals. If a terminal receives information from some other terminal, the received information may at example block 2006 be combined with other information previously received such that any received information with version V or timestamp T that is related to some terminal T1 replaces any previous information for terminal T1 that has a version less than V or a timestamp prior to T. A terminal may continue to broadcast information for itself at example block 2008 (e.g., as at block 2002) but once the terminal has received information related to one or more other terminals at blocks 2004 and 2006, the terminal may also relay such information along with its own information. At example block 2010, a terminal T1 may determine that another terminal T2 has acknowledged information that terminal T1 sent previously related to some terminal T3, if information is received from terminal T2 that implicitly or explicitly acknowledges this information (e.g., as described previously). It should be noted that terminal T3 at block 2010 may be a different terminal to T1 or may be terminal T1. At example block 2012, if all terminals from which terminal T1 receives broadcast explicitly or implicitly acknowledge the information stored in terminal T1 for any terminal T3, terminal T1 may cease relaying information for terminal T3.

At example block 2014, a terminal T1 may later resume relaying information for a terminal T3, e.g., after receiving new information for terminal T3 (e.g. with a higher version or later timestamp) or after receiving a direct broadcast from some terminal T4 that did not yet acknowledge the information stored in terminal T1 for terminal T3.

In certain example implementations, techniques may be implemented to support relaying of information between terminals without network support using information tags. The techniques support an explicit request for transmission of missing information and are referred to here as "tagged transmission". The previous explicit and implicit acknowledgment mechanisms may, in certain situations, produce unnecessary broadcasting (e.g., until a sender receives sufficient acknowledgments to cause the sender to stop sending). To reduce unnecessary transmission further, tagged transmission may be used in which information items may be associated with a unique tag. For example, information related to a particular terminal T1 may have a tag comprising the terminal T1's identity (ID), an information type or information identifier and a version number or timestamp. In one implementation, a tag t related to information i for a particular terminal t1 may be generated by terminal t1, broadcast by terminal t1 along with i and subsequently relayed along with i by other terminals. A terminal T1 that receives or internally generates information I with tag T may then relay or broadcast, respectively, I and T together a few times and subsequently just relay or broadcast T (without I) which may be much smaller than I. A terminal T2 that detects terminal T1 relaying or broadcasting T but not I may then broadcast a request for I if it does not yet have I (or only has an earlier version of I associated with a tag with a lower version number or earlier timestamp) by sending the tag T together with a request indication. Terminal T2 may, for example, determine, at least in part, from the content of the tag (e.g. from any terminal ID and information type identifier in the tag) whether or not terminal T2 wishes to receive I and thus whether or not to request I by broadcasting a request indication together with the tag T. Should terminal T2 decide to request I, terminal T2 may, for example, optionally include terminal T1's ID as well as the tag T in the request to indicate that terminal T1 but not other terminals should transmit I. The inclusion of terminal T1's ID in the request may avoid additional transmission from other terminals. If terminal T1 detects the request for I from terminal T2, terminal T1 may send I and T together once or several times so that terminal T2 may obtain I. If terminal T2 does not receive I, it may repeat the request and terminal T1 may repeat sending I. Once terminal T2 has information I, it may signify this to terminal T1, e.g., by broadcasting just the tag T without I and not in association with a request. As an alternative to requesting transmission only from terminal T1, terminal T2 may send a request for I but not include the ID of terminal T1, in which case any other terminal that has the information I and the associated tag T, may broadcast I and T once or several times to enable receipt by terminal T2.

For simplicity and efficiency, in certain example implementations of tagged transmission, a request for information I associated with a tag T may optionally be signaled by a null request. In this case, a terminal T1 may assume another terminal T2 requests information I that is associated with a tag T if terminal T1 does not see terminal T2 sending either I and T together or just T without I. With this implementation, each terminal t1 may periodically send either the latest information i and associated tag t for every other terminal t2 or just the tag t without the information i. The lack of receipt of either i and t (or a later version of I and t) or just t (or a later version of t) from some other terminal t3 may then be taken as evidence that the terminal t3 does not have information for the terminal t2 and thus needs to be sent the information i and associated tag t. The use of a null request may be efficient when information needs to be sent to all terminals (e.g. terminals will not be able to selectively request or not request different information items).

When tagged transmission is used as described above (and with or without the use of a null request), a terminal T1 may resume sending any information I associated with a tag T whenever it receives (or internally generates) a later version of I associated with a new tag with a higher version or later timestamp than that for the previous tag T. For an asymmetric case where a terminal T1 may receive signals from another terminal T2 but where terminal T2 is unable to receive signals from terminal T1, terminal T1 will not be able to send I to terminal T2 even if sees a request for I from terminal T2. Since terminal T2 would have learnt of I from some terminal (which would generally not be T1 since it is assumed that T2 cannot receive from T1), there is a chance that another terminal (that is not T1) may be able to send I to terminal T2. If not, terminal T1 may observe T2 requesting I and consequently may send I but without T2 being able to receive I. In this case, the unnecessary transmission from terminal T1 may, in certain instances, still be limited by a limit on the number of transmissions of I from any terminal that may be imposed for the tagged transmission technique. In another asymmetric case where a terminal T2 may receive signals from terminal T1 but terminal T1 is unable to receive signals from terminal T2, the terminal T2 may request I but terminal T1 will not see the request. Terminal T2 may, for example, repeat the request for I many times without receiving I, but if the size of T is small, this may not use much bandwidth. In general, tagged transmission schemes may be efficient when the information I size is large and the tag T size is small which may arise when information is exchanged among terminals without network support via broadcast and relaying to support individual proximity services after proximity or near proximity has been discovered.

Information for a terminal T that is broadcast or relayed among other terminals may be used to support discovery of the terminal T by one or more of the other terminals for different proximity services and may be used to assist proximity services being used by the terminal T. For example, a set of information A related to a terminal T that is broadcast by terminal T and/or relayed by other terminals to support discovery of proximity for T may be indicative of an identity of the terminal T, a list of proximity services supported by T (e.g. with each proximity service identified by means of a unique expression), identities of other terminals T* known by T to be in direct radio range of T, and/or location and signal information for T and terminals in T*, just to name a few examples. A different set of information B related to terminal T that is used to assist proximity services in use by T may be indicative of: (i) message(s) for any proximity service P in use by T that is (are) intended to be transferred to other terminals in proximity to T; (ii) identities of terminals previously discovered to be in proximity to T (which may constitute a recipient list for the information); (iii) information to setup or release sessions or connections between T and other terminals in proximity to T; and/or (iv) data traffic between T and other terminals in proximity to T (e.g. speech/video clips, IM), just to name a few examples. In certain instances, information sets A and B above may be distinguished and supported differently, e.g., using different protocols and different broadcast and relay mechanisms for information set A versus information set B.

In certain instances, information set B for terminal T that is used to assist proximity services in use by T may be transferred to other terminals via a more efficient means of broadcast and relaying than information set A that is used to support discovery of proximity by or for T. This may be due to a likelihood of information set B being much greater in size than information set A.

In certain example implementations, techniques may be implemented to support routing of certain communication between terminals. The previous example mechanisms (e.g. using explicit acknowledgment, implicit acknowledgment and tagged transmission) may enable information to be broadcast and relayed throughout a group of terminals without network support but may not be suitable for directed communication, e.g., where a terminal may need to send signaling, data or voice to just one other terminal or to a particular group of terminals within a larger set of terminals. In some instances, in order to support directed communication, each terminal T may support a hop by hop method of routing by maintaining a routing table showing other terminals in direct radio range of T via which communication can be transferred to any other destination terminal. Such a routing table may, for example, be compiled via information received by each terminal as part of proximity discovery support (e.g. as enabled by broadcast and relaying of information items in information set A described previously herein). In certain implementations, a routing table at a terminal T may be next hop based—showing, for each destination terminal D, other terminals S in direct radio range to terminal T via which information can be relayed from T to the destination terminal D. In certain instances, such a table may identify a subset of terminals S* in S that are able to relay information to terminal D via a minimum number of additional relay terminals. If terminal T needs to send or relay a message to terminal D, it may forward the message to some terminal t in S*. If S* contains more than one terminal, t may, for example, be chosen by T from within S* (a) at random, (b) based on known (e.g. reported) relay or throughput capabilities of each terminal in S*, (c) based on a reported congestion status of each terminal in S* or (d) via some combination of (a), (b) and (c). The terminal t to which terminal T forwards the message would then (if it is not the destination D) forward the message to another terminal using the same routing method as used by terminal T. Eventually, the message may reach the destination D via a minimum number of intermediate relay terminals (or hops). Terminal T may maintain signaling links or data links to the terminals in S, e.g., so messages may be efficiently forwarded. In certain implementations, a routing table at terminal T may instead enable source routing by providing a complete sequence of intermediate relay terminals via which communication may be routed to any destination terminal D from terminal T. Such a source routing table may be compiled by any terminal T based on information received from terminals related to discovery of proximity (e.g. based on information of the type described previously for information set A). In certain instances, terminal T may include in any message to be sent to a destination terminal D using source routing a sequence of the intermediate relay terminals via which the message may be relayed in order to allow each intermediate relay terminal to determine the next terminal to which the message should be sent.

In certain example implementations, techniques may be implemented to support broadcast and relaying of information among terminals to support various group services. In certain instances, a group of terminals in proximity to one another may use a group proximity service, e.g., (i) enabling one user to communicate with all the other users in the group or communicate selectively with some of the other users or (ii) enabling one terminal to exchange information automatically with some or all of the other terminals in the group (e.g. location information and sensor information for the environment). Such group proximity service(s) may be used for public safety and by various closed user groups, e.g., associated with a particular company, a club, a gaming service or some private interest group, just to name a few examples. To support such group service(s), it may be beneficial for each terminal to be informed of the identities of other terminals engaging in the same service, and which may be in proximity (or possibly in near proximity). To establish proximity without any network support (e.g., when terminals are out of network coverage), the previous methods of broadcast and relaying and/or the like may be used.

Use of a Proximity Server

In certain example implementations, techniques may be implemented for server support of proximity discovery. In such a case, a network that supports discovery of proximity for the terminals that it serves may contain a server, referred to here as a "proximity server" or "network proximity server", that enables discovery of terminals that use or have an interest in the same proximity service(s) and are in proximity to one another. Information concerning terminals discovered to be in proximity to one another may then be transferred by the proximity server to the concerned terminals to enable the terminals (or certain applications on the terminals or the terminal users) to engage in proximity services of mutual interest to one another. In certain example implementations for networks that support LTE, a network proximity server may obtain proximity data for all UEs in a served area directly from the UEs and/or from MMEs and eNodeBs in the network that serve these terminals. In certain instances, a proximity server may comprise a new entity or a new logical function in an existing entity or subsystem (e.g., eNodeB, MME, PDG, IMS, SLP, E-SMLC) and may reside in a serving network for a UE.

In certain example implementations, a network proximity server may scan data it receives that is related to UEs in its serving area for potential proximity matches. For example, a network proximity server may: (i) find all UEs using or having an interest in the same proximity service; (ii) authenticate UE association with each proximity service that a UE claims is used or of interest; (iii) verify geographic, cellular or probable radio proximity conditions for UEs that make use of (or have an interest in) the same proximity service; and/or (iv) where a set S of UEs using or interested in the same proximity service are discovered to be in proximity, send data on each UE in S to some or all of the other UEs in S according to which UEs in S are allowed to receive this data.

In certain example implementations, a network proximity server may instead or in addition broadcast all proximity data that it receives (e.g. from UEs, MMEs, eNodeBs) to all UEs served by the network with UEs then responsible for proximity discovery. In certain instances, data broadcast in each network cell may comprise data applicable only to UEs in or nearby to the cell to reduce the amount of broadcast data.

In certain example implementations, a UE (or the serving MME/eNB for a UE) may update data in a proximity server (related to discovery of proximity) periodically or whenever there may be some change in the data. By way of example, certain updated data for a particular UE may indicate a change of UE serving cell, a change of UE location, a change of a set of other UEs detected by the UE via LTE-D, and/or a change of user or App requirements in the UE related to a certain proximity service.

In certain example implementations, a network proximity server may remove data it has for a UE following a timeout, e.g., in response to not receiving further data updates from the UE. In certain instance, a network proximity server may receive proximity data (e.g. for network defined proximity services) via certain operations and maintenance functions, and/or from other network servers, etc. In some implementations, network proximity server support may not be needed for proximity services that only make use of radio proximity and can be supported by terminals without network assistance.

In certain example implementations, techniques may be implemented for LTE-D support and discovery of proximity by a network proximity server. For example, in certain implementations, proximity discovery by terminals using direct radio signaling (e.g. LTE-D) may be enabled to run autonomously for some user cases—e.g. public safety. In certain instances, network control of direct radio (e.g. LTE-D) discovery may be optional. For example, a network may inform UEs whether or not direct radio discovery may be permitted and provide physical and transport related parameters to assist terminals to discover proximity (e.g. may provide frequencies and signaling related parameters that terminals should all use for direct radio discovery). In some instances, if network control is absent (e.g., not implemented), proximity services may simply be unavailable or may be supported using default information configured in each terminal (e.g. permitted spectrum in the case of proximity services for public safety).

In certain example implementations, discovery of proximity by a network proximity server may be optional and may instead be supported by UEs if requested by the serving network. In certain instances, some network control parameters for proximity discovery may be broadcast to terminals and/or provided to terminals on network attachment or (for IMS control) on IMS registration. Network control parameters may, for example, specify how interaction between terminals and the network proximity server may operate, e.g., whether UEs need to send data to a proximity server concerning UEs discovered via direct radio contact. In certain instances, discovery by network proximity servers of proximity between terminals served by different networks may need to take account of UE subscription data or user preferences—e.g. in order to protect UE or user identities when sending proximity related information to another network and/or restrict the degree to which a terminal in one network can be discovered to be in proximity to a terminal in another network. In certain implementations, applications may attempt to set proximity service parameters to maximize use of direct radio discovery (due to normal higher efficiency than network discovery of proximity).

Figure 14:
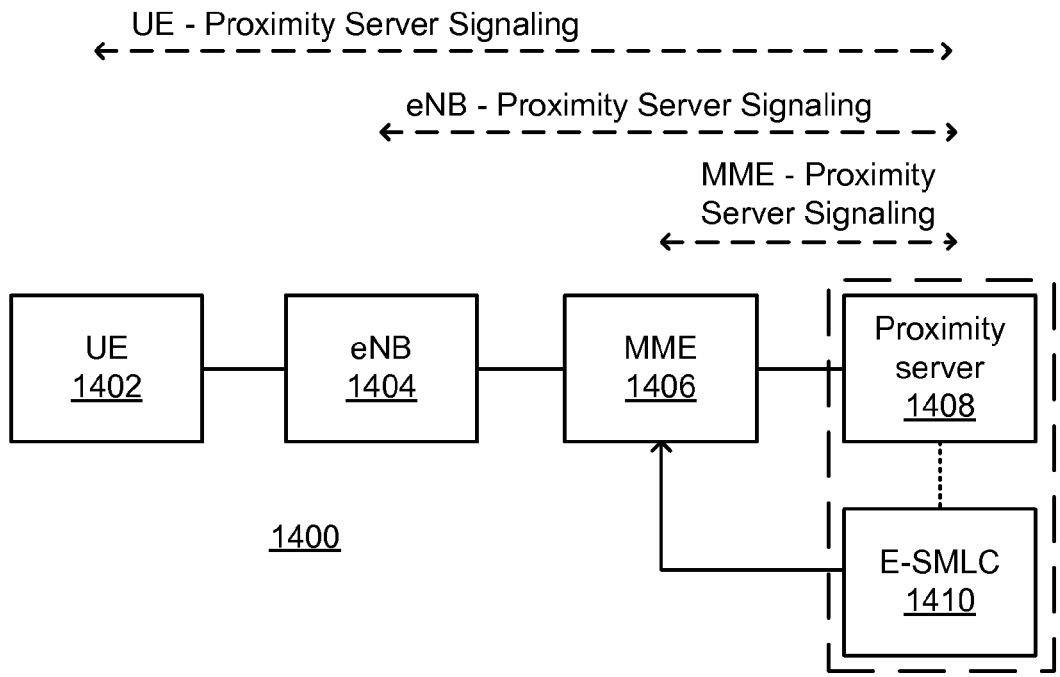
FIG. 14, FIG. 15 and FIG. 16 are schematic block diagrams illustrating certain example arrangements to support a network proximity server, in accordance with an example implementation.

Attention is drawn next to FIG. 14, which is a schematic block diagram illustrating an example arrangement 1400 in which discovery of proximity between nearby devices is discovered by or with the assistance of a network proximity server in an LTE network that makes of control plane based signaling to communicate with other entities. As illustrated, example arrangement 1400 may comprise an eNB 1404 coupled to a UE 1402 and also an MME 1406. MME 1406 may be coupled to a proximity server 1408 and possibly to an E-SMLC 1410. In certain implementations, as illustrated by the dashed-line box, proximity server 1408 and E-SMLC 1410, though logically separate, may be physically combined, e.g., to benefit from proximity & location synergies, etc., or may be physically separate and enabled to communicate via a communications link. Control plane based signaling may be supported between UE 1402 and proximity server 1408, for example, using NAS capabilities and NAS signaling that may be partly defined already for 3GPP networks in such 3GPP TSs as TS 24.301. Proximity server 1408 may obtain proximity related information for UE 1402 (e.g. UE identity, UE location, UE serving cell, serving eNB or TA, nearby UEs detected by direct radio means, proximity services supported by or of interest to the UE) directly from UE 1402 (e.g. using the aforementioned NAS signaling) and/or from eNB 1404 and/or MME 1406. Location related information for UE 1402 may in addition or instead be obtained by proximity server 1408 from E-SMLC 1410. To locate a target UE (e.g. UE 1402), proximity server 1408 may send a location request to (serving) MME 1406 for UE 1402. In certain instances, MME 1406 may transfer such a request to E-SMLC 1410 which may then locate UE 1402 using 3GPP control plane procedures (e.g. as defined in 3GPP TS 36.305) and return the location result to MME 1406 and thence to proximity server 1408. Proximity server 1408 may use the information obtained for UE 1402 and other UEs to determine which UEs may be in proximity or near proximity and/or to predict the probable future occurrence of proximity as described elsewhere here. Proximity server 1408 may then inform UEs (e.g. UE 1402) discovered to be in proximity to other UEs using control plane signaling.

Figure 15:
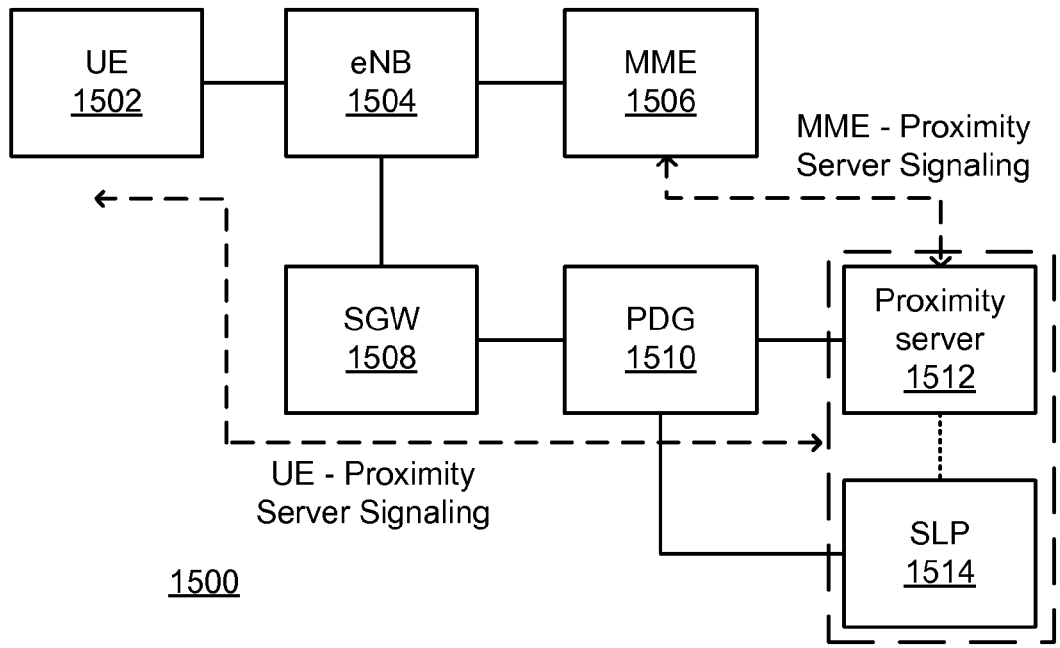

Attention is next to FIG. 15, which is a schematic block diagram illustrating an example arrangement 1500 in which discovery of proximity between nearby devices is discovered by or with the assistance of a network proximity server in an LTE network that makes of user plane based signaling to communicate with other entities. In contrast to control plane support as illustrated in FIG. 14, user plane support may reduce impacts to network eNBs and MMEs to support discovery of proximity. Example arrangement 1500 may comprise an eNB 1504 coupled to UE 1502 and also an MME 1506. MME 1506 may be coupled to a proximity server 1512. As shown, eNB 1504 may be coupled to an SGW 1508, which may be further coupled to a PDG 1510. PDG 1510 may be coupled to proximity server 1512 and to a SUPL SLP 1514, and proximity server 1512 may be coupled to SLP 1514. In certain implementations, as illustrated by the dashed-line box, proximity server 1512 and SLP 1514, though logically separate, may be physically combined, e.g., to benefit from proximity & location synergies, etc.

In this example, two potential signaling paths are indicated, the first comprising MME-Proximity Server Signaling (e.g., which may add efficiency), and the second comprising UE-Proximity Server Signaling. As for a control plane based proximity server (e.g. server 1408 in FIG. 14), proximity server 1512 may obtain information to support discovery of proximity between UEs directly from the UEs (e.g. UE 1502) using user plane signaling in which information may be sent in the form of data (e.g. using TCP/IP) from a network perspective. The information may be similar to or the same as in FIG. 14—e.g. may include UE identity, UE location, UE serving cell, serving eNB or TA, other nearby UEs detected and proximity services supported by or of interest to the UE. Proximity server 1512 may also obtain some or all of this information from MME 1506 if proximity server 1512 is linked to MMEs. In certain implementations, a proximity server address (e.g. the IP address or the FQDN for proximity server 1512) may be discovered by UE 1502 (e.g. using the IETF DHCP protocol) or may be provided to UE 1502, e.g., on network attachment by MME 1506 or on connection to PDG 1510 or may be broadcast to all UEs by eNBs such as eNB 1504. UE 1502 may then use the discovered address for proximity server 1512 to transfer data to proximity server 1512 and/or request data from proximity server 1512. In some instances, proximity server 1512 may use a (SUPL) SLP 1514 to assist with UE location. Thus, for example, proximity server 1512 may send a location request for some target UE directly to an associated SLP 1514 after which SLP 1514 may invoke SUPL to locate the UE and return the location to proximity server 1512.

Figure 16:
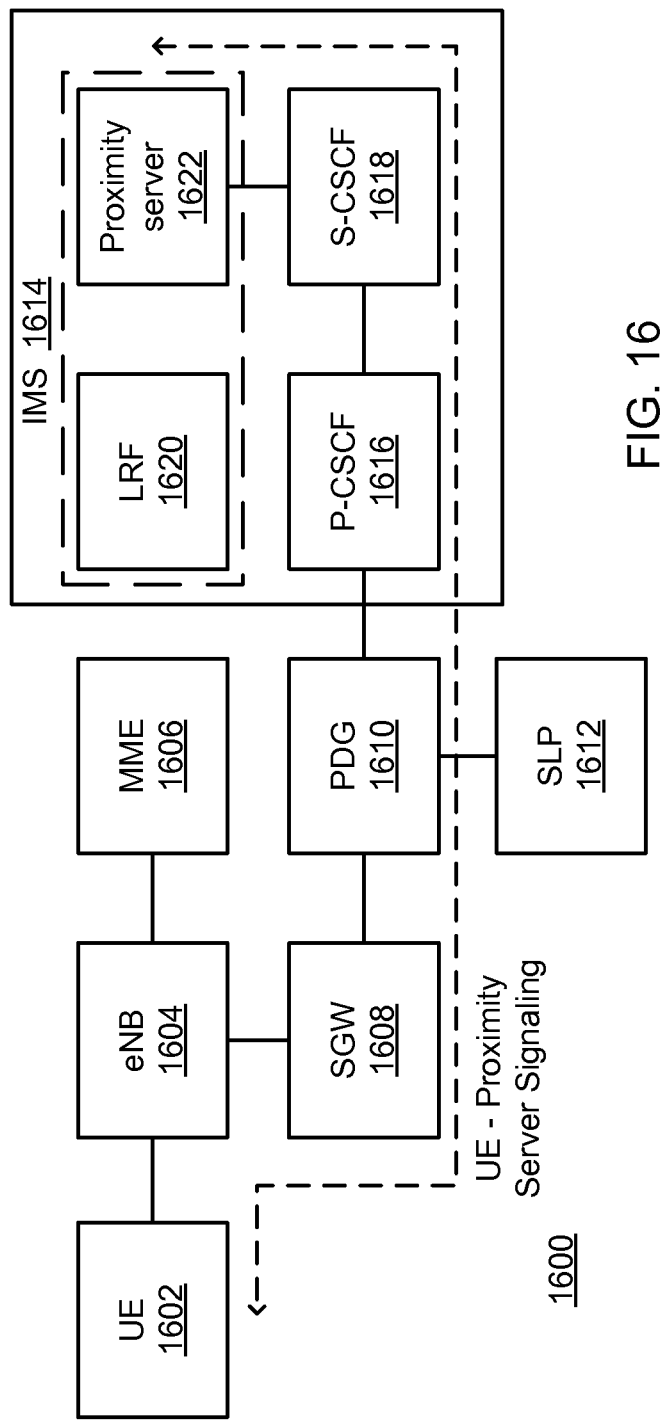

Attention is drawn next to FIG. 16, which is a schematic block diagram illustrating an example arrangement 1600 in which discovery of proximity between nearby devices is discovered by or with the assistance of a network proximity server that makes use of IMS based signaling to communicate with other entities. Example arrangement 1600 may support UE-proximity server signaling in an LTE network and may comprise an eNB 1604 coupled to UE 1602 and also an MME 1606. As shown, eNB 1604 may be coupled to an SGW 1608, which may be further coupled to a PDG 1610. PDG 1610 may be coupled to an SLP 1612 and to an IMS 1614. In this example, IMS 1614 may comprise a P-CSCF 1616, coupled to PDG 1610 and to an S-CSCF 1618. S-CSCF 1618 may be coupled to a proximity server 1622. Proximity server 1622 may be coupled to an LRF 1620. Proximity server 1622 may function as an IMS Application Server (AS) in some implementations. In certain implementations, as illustrated by the dashed-line box, proximity server 1622 and LRF 1620, though logically separate, may be physically combined, e.g., to benefit from proximity & location synergies, etc. As for a control plane or a user plane based proximity server (e.g. server 1408 in FIG. 14 or server 1512 in FIG. 15), proximity server 1622 may obtain information to support discovery of proximity between UEs directly from the UEs (e.g. UE 1602) using IMS based signaling in which information may be sent in the form of data and contained in SIP messages. The information may be similar to or the same as in FIGS. 14 and 15—e.g. may include UE identity, UE location, UE serving cell, serving eNB or TA, other nearby UEs detected and proximity services supported by or of interest to the UE.

In certain implementations, proximity server 1622 may reside in the home network of UE 1602 rather than in the serving network for UE 1602 (except when the serving network for UE 1602 is the home network). However, in certain instances this variation may be unable to detect proximity for roaming UEs without some further interaction between the home network of a roaming UE and the serving network of the UE (e.g. involving interaction between the proximity servers in different networks). In certain implementations, it may be beneficial to make use of certain (new) SIP signaling parameters. One advantage may be proximity support of certain IMS services, e.g., use of LTE-D for network offload, which may trigger IMS communication between two UEs, e.g., after proximity is detected.

Protocol Aspects

In certain example implementations, techniques may be implemented to support various protocol aspects that may be implemented in certain example proximity services. In certain example implementations, a network proximity server may be based on control plane (CP) or user plane (UP) signaling support—e.g. as described previously for FIG. 14 and FIG. 15, respectively. In certain instances, a network proximity server may be located in a serving network (e.g. not necessarily a home network) with respect to all UEs served by this network that make use of or have an interest in proximity services. In an example network mode of operation, such UEs may have network connectivity and the network may assist with discovery of proximity and with enabling communication via direct radio means (e.g. LTE-D) for certain UEs found to be in proximity. In an example LTE-D mode of operation applicable to an LTE network, such UEs may discover proximity using LTE direct (LTE-D) signaling between one another. In certain instances, an LTE-D mode of operation may be used without network support (e.g., if there is no network coverage) or with network support (e.g., when proximity discovery may be supported via (i) LTE-D signaling between UEs and (ii) a network proximity server that may receive information from UEs obtained via LTE-D signaling and then proceed to discover cases of proximity using this information). In certain example implementations, protocol layering for ProSe support may extend existing CP and UP protocol layering for LTE, e.g., as defined in 3GPP TS 23.401.

Figure 7:
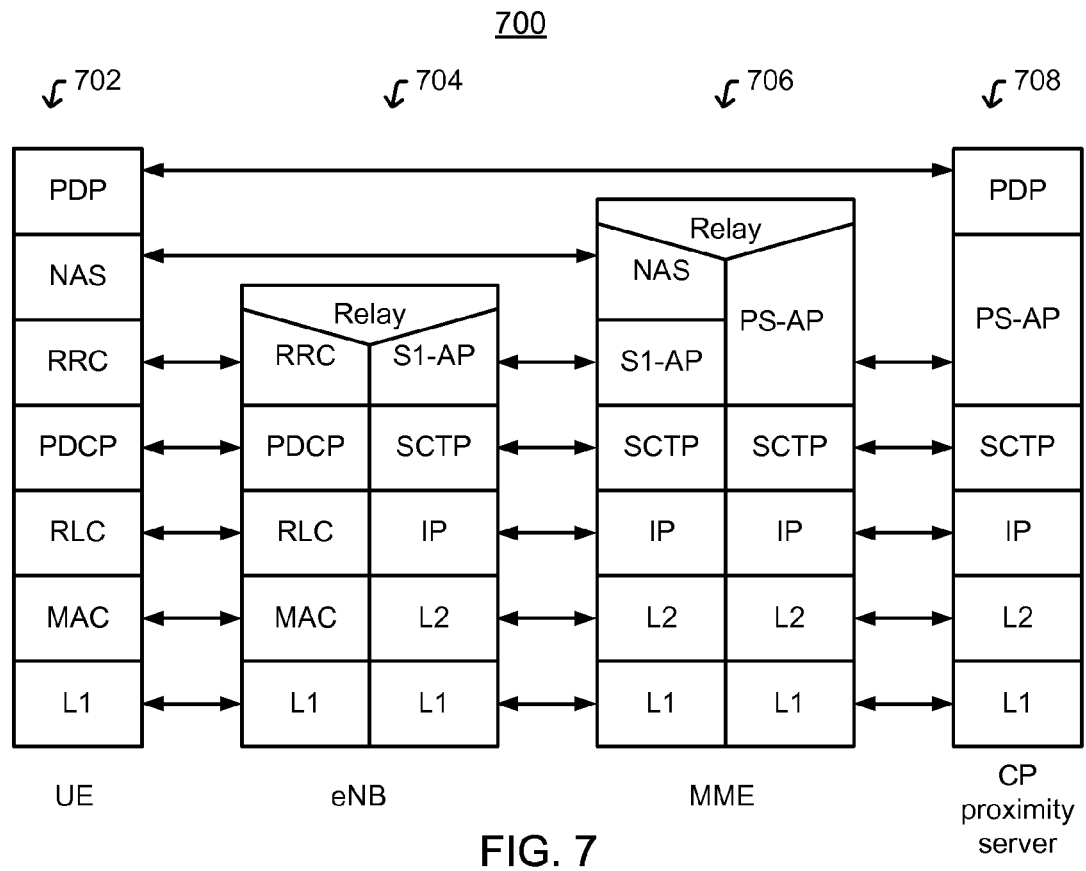
FIG. 7 and FIG. 8 illustrate some example control plane protocols that may be implemented to transmit and/or relay information for use in determining a state of proximity between two or more mobile devices, in accordance with an example implementation.
Figure 8:
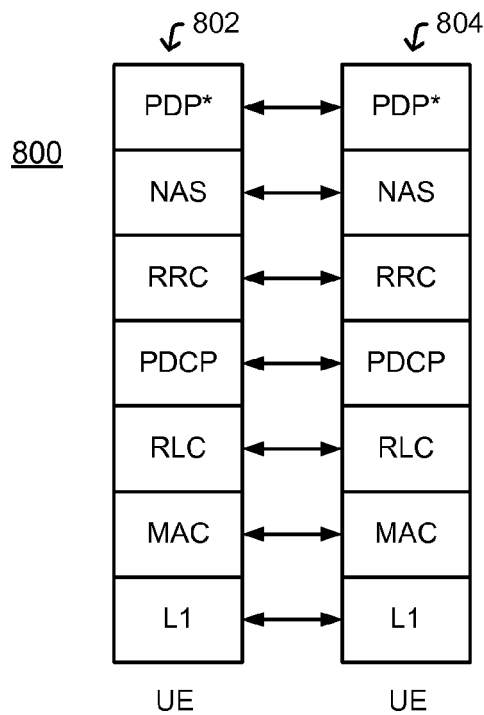

Attention is drawn next to FIG. 7 and FIG. 8, which illustrate some example control plane protocols that may be implemented to transmit, receive and/or relay information for use in determining a state of proximity between two or more mobile devices in an LTE network, in accordance with an example implementation. FIG. 7 shows example CP Protocols 700 that may support a network mode using a network CP Proximity Server—e.g. as described earlier in association with FIG. 14. Included in CP Protocols 700 are corresponding protocol stacks 702 (for a UE), 704 (for an eNB), 706 (for an MME), and 708 (for a network CP Proximity Server). CP Protocols 700 may be applicable if a network uses a CP proximity server and provides protocol support for signaling between example network resources and a UE. As shown, an example stack 702 may comprise various layers such as an L1, MAC, RLC, PDCP, RRC, NAS, and a PDP (Proximity Discovery Protocol). As shown, an example stack 704 may comprise various layers such as an L1, L2, MAC, IP, RLC, PDCP, SCTP, RRC, and S1-AP. As shown, an example stack 706 may comprise various layers such as an L1, L2, IP, SCTP, S1-AP, PS-AP (Proximity Services Application Protocol), and NAS. As shown, an example stack 708 may comprise various layers such as an L1, L2, IP, SCTP, PS-AP, and PDP. All protocol layers except for the PS-AP and PDP layers may function as described in 3GPP and other (e.g. IETF) standards. For example the NAS, RRC, S1-AP, MAC, RLC and PDCP protocol layers may operate as described in 3GPP TSs 24.301, 36.331, 36.413, 36.321, 36.322 and 36.323 respectively whereas the SCTP protocol layer may operate as described in IETF RFC 4960. The PS-AP and PDP layers may be new layers defined specifically for support of proximity services using a network based proximity server. As shown in FIG. 7, protocol layers may be paired to support communication between a pair of entities which may either be directly connected (e.g. to support communication by lower protocol layers) or separated by one or more intermediate entities functioning as relays.

FIG. 8 shows example CP Protocols 800 similar to those in FIG. 7 that may support an LTE-D Mode in which a pair of UEs communicate directly with one another. Included in CP Protocols 800 are corresponding protocol stacks 802 (for a first UE) and 804 (for a second UE). CP Protocols 800 may be applicable for signaling between the first and second UE and may be applicable both when proximity is discovered by UEs with little or no network support and when proximity is discovered using a network proximity support (e.g., based on protocols described for FIG. 7 or described later for FIG. 9). As shown, example stacks 802 and 804 may comprise various (corresponding) layers such as an L1, MAC, RLC, PDCP, RRC, NAS, and PDP*.

PDP may represent a protocol layer that may be used to discover proximity services, e.g., in accordance with various techniques provided herein. In certain implementations, different variants of PDP may be used in network mode (as shown in FIG. 7) versus LTE-D mode (e.g. as shown in FIG. 8) or different protocols could be used. Accordingly, FIG. 8 is illustrated using a PDP* layer that may be similar to but not necessarily identical to the PDP layer shown in FIG. 7. For example, PDP and PDP* could share common procedures, messages and parameters but some procedure, messages and/or parameters may be different.

Figure 9:
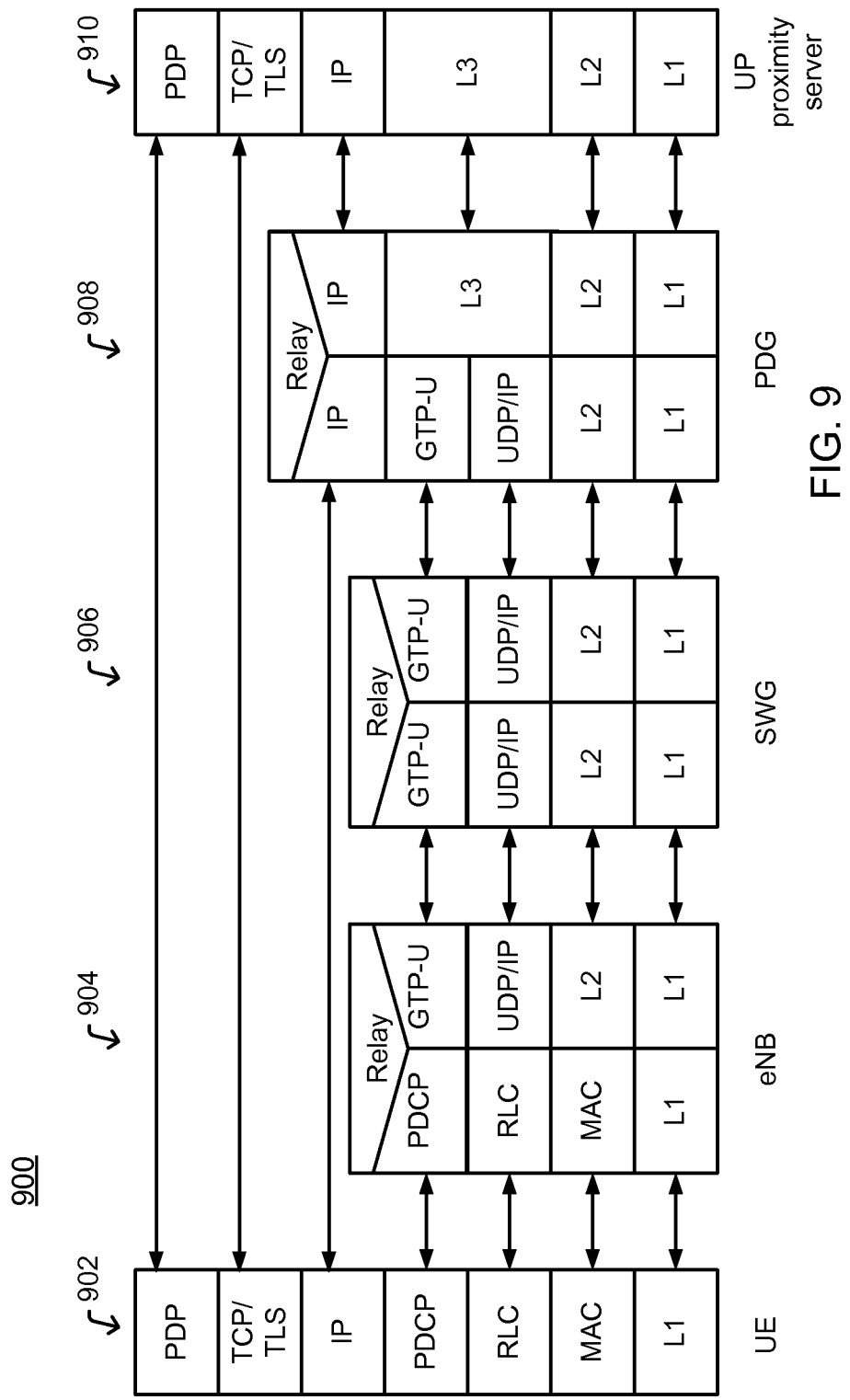
FIG. 9 and FIG. 10 illustrate some example user plane protocols that may be implemented to transmit and/or relay information for use in determining a state of proximity or supporting proximity services between two or more mobile devices, in accordance with an example implementation.
Figure 10:
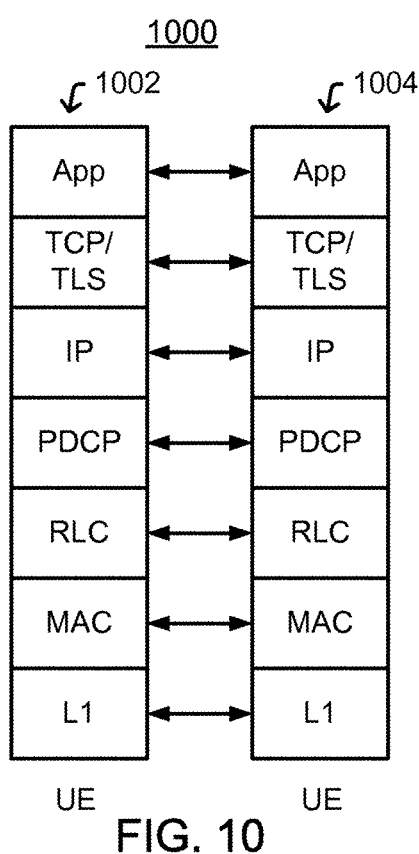

Attention is now drawn to FIG. 9 and FIG. 10, which illustrate some example user plane protocols that may be implemented to transmit, receive and/or relay information in an LTE network for use in (i) determining a state of proximity between two or more mobile devices in the case of FIG. 9 and (ii) transferring data, voice or other media between a pair of UEs in the case of FIG. 10, in accordance with an example implementation. FIG. 9 shows example UP Protocols 900 that may support a network mode using a network UP Proximity Server—e.g. as described earlier in association with FIG. 15. Included in UP Protocols 900 are corresponding protocol stacks 902 (for a UE), 904 (for an eNB), 906 (for an SWG), 908 (for a PDG), and 910 (for a network UP Proximity Server). UP Protocols 900 may be applicable if a network uses a UP proximity server and provides protocol support for signaling between the network and UE. As shown, an example stack 902 may comprise various protocol layers such as an L1, MAC, RLC, PDCP, IP, TCP/TLS, and PDP. As shown, an example stack 904 may comprise various layers such as an L1, L2, MAC, RLC, UDP/IP, PDCP, and GTP-U. As shown, an example stack 906 may comprise various layers such as an L1, L2, UDP/IP, and GTP-U. As shown, an example stack 908 may comprise various layers such as an L1, L2, L3, UDP/IP, GTP-U, and IP. As shown, an example stack 910 may comprise various layers such as an L1, L2, L3, IP, TCP/TLS, and PDP. All layers except the PDP layer may function the same as described in 3GPP, IETF and other standards, Thus, for example, the MAC, RLC, PDCP and GTP-U protocol layers may operate as described in 3GPP TSs 36.321, 36.322, 36.323 and 29.060, respectively whereas the UDP, TCP and TLS protocol layers may operate as described in IETF RFCs 768, 793 and 4346, respectively. The PDP layer may be a new layer defined specifically for support of proximity services using a network based proximity server and may be similar to or the same as the PDP layer shown in FIG. 7. As shown in FIG. 9, protocol layers may be paired to support communication between a pair of entities which may either be directly connected (e.g. to support communication by lower protocol layers) or separated by one or more intermediate entities functioning as relays.

FIG. 10 shows example UP Protocols 1000 that may support transfer of data related to support of proximity services between applications resident in two UEs using LTE-D mode. Included in UP Protocols 1000 are corresponding protocol stacks 1002 (for a first UE) and 1004 (for a second UE). UP Protocols 1000 may be used to support peer to peer (P2P) signaling between applications that support particular proximity services (e.g., for public safety) and can be applicable when network support is available for discovering proximity (e.g. as described in association with FIGS. 14, 15 and 7) or when proximity is discovered by UEs with little or no network support (e.g. as supported by the protocol layering in FIG. 8)). As shown, example stacks 1002 and 1004 may comprise various (corresponding) layers such as an L1, MAC, RLC, PDCP, IP, TCP/TLS, and an applicable (App) layer that is specific to the proximity service or services supported by the communicating applications. In certain instances, TLS and TCP over IP may be used to first establish a secure and reliable connection between the pair of endpoint entities in each figure—e.g. between the UE and UP proximity server in FIG. 9 and between the pair of UEs in FIG. 10. Secure and reliable communication may then occur at the PDP level in FIG. 9 and at the application (App) level in FIG. 10.

In certain example implementations, techniques may be implemented to support ProSe signaling in an LTE network using the RRC protocol layer—e.g. as in association with the protocol layering described for FIGS. 7 and 8. In some implementations, certain RRC roles may be common to both a network mode of operation as shown in FIG. 7 and an LTE-D mode of operation as shown in FIG. 8. For this common mode of operation, RRC may be used to broadcast (or, for LTE-D mode, relay) information used for proximity discovery using new LTE SIBs dedicated to supporting LTE-D. For example, a terminal (UE) may broadcast using a new SIB the identity of the terminal (e.g., a temporary network assigned identity or a global permanent identity of the terminal) and expressions identifying proximity services of interest to the terminal. Information received from another UE at the RRC level (e.g. an identity of the other UE and expressions of interest to the other UE) may be passed up to the NAS protocol layer by the RRC layer inside the receiving UE and may then be passed to the PDP layer inside the UE.

Other RRC roles may be specific to supporting proximity services between a pair of terminals in LTE-D mode—e.g. according to the protocol layering described for FIG. 8. For support of LTE-D mode, some information transferred by RRC may be broadcast (and/or relayed) to other UEs using signals that may be highly detectable, e.g., similar to a Positioning Reference Signal used to support LTE positioning (e.g. as described in 3GPP TS 36.211) and orthogonal to other signals in frequency, coding or time. RRC may also be used to establish and release LTE-D signaling connections between pairs of UEs. RRC may be further used to establish multipoint LTE-D links between groups of three or more UEs, e.g., where transmission from any one UE may be received by all the other UEs in any group. RRC may also be used to establish, modify and release point to point (or multipoint) traffic bearers between two (or three or more) UEs associated with subsequent UP communication of data or media to support particular proximity services (e.g. according to the protocol layering shown in FIG. 10). RRC may be used to help establish time synchronization between two or more UEs (e.g., in the absence of a common network or other (e.g. GPS) time) which may help avoid overlapping LTE-D transmission by the UEs and thereby improve the reliability of LTE-D communication. In certain instances when the timing in UEs is synchronized using RRC (or using some common time reference such as GPS or network timing), UEs may broadcast and relay information to one another at different non-overlapping transmission times. In certain instances, these transmission times may be made available to other UEs, e.g., so UEs may know when to listen for other UEs. Before time synchronization is established between UEs, the UEs may send only small amounts of data to one another using LTE-D, e.g., possibly at random times. Once the UEs are time synchronized, the amount of data and signaling transfer using LTE-D between the UEs may significantly increase. If a network is available, commonly available network time either from one eNB or from multiple synchronized UEs may be used to achieve time synchronization among UEs, in certain implementations. In certain example implementations, RRC may be used in LTE-D mode to measure RTTs between pairs of UEs and thereby help establish whether the UEs are in proximity.

In certain example implementations, techniques may be implemented to support ProSe signaling in an LTE network using the NAS protocol layer—e.g. as in association with the protocol layering described for FIGS. 7 and 8. For example, a role of the NAS protocol layer (e.g. when a network proximity server is used as described for FIG. 14 and/or when protocol layering is as shown in FIG. 7) may include relaying information between a CP proximity server and a UE, e.g., via an MME. In certain instances, NAS may be used to help acquire certain proximity related information (e.g., timing advance, serving eNB, proximity services of interest) by an MME from a UE which the MME may then convey to a proximity server. In certain implementations, a role of NAS in LTE-D Mode (e.g., in association with the protocol layering shown in FIG. 8) may include establishing (and later releasing) signaling connections and sessions between pairs or groups of UEs over which proximity related information may be transferred, e.g., at the PDP level. In certain instances, this connection and session setup and release may be based on (e.g. may be similar to) that supported in NAS between a UE and an MME as defined in 3GPP TS 24.301. NAS may, in some implementations, be used between a pair of UEs (e.g. according to the protocol layering shown in FIG. 8) to setup and release data bearers between pairs of UEs already in proximity to one another to support UE-UE communication for particular proximity services supported by certain Apps, e.g., with the UE-UE communication then occurring using the UP Protocols 1000 (FIG. 10). In certain implementations, NAS may be used (e.g. with the protocol layering shown in FIG. 8) to transport signaling messages between UEs on behalf of ProSe Apps as an alternative to transferring these messages using data bearers with UP protocol layering (e.g. as in FIG. 10).

In certain example implementations, techniques may be implemented to support ProSe signaling in an LTE network using a PS-AP (Proximity Services Application Protocol) Layer for ProSe Signaling, e.g., for a network mode with a CP Proximity Server (e.g. as in FIG. 14 and FIG. 7). In certain instances, a PS-AP protocol may enable exchange of information between a CP proximity server and an MME. For example, a PS-AP protocol may enable an MME to transfer to a proximity server the IDs of UEs attached to the MME, the current serving eNB or serving TA for each UE and the proximity services (and associated parameters) each UE subscribes to. Such transfer may occur on request by the proximity server or when a UE attaches to the serving network or changes its serving MME or under other conditions. In certain implementations, a PS-AP protocol may enable a request from a proximity server to an MME for the locations of one or more UEs attached to the MME. For any such UE location request sent to the MME, the MME may relay the location request to an attached E-SMLC which may locate the UE using the 3GPP CP location solution defined in 3GPP TS 35.305. In some instances, such a direct location request between a CP proximity server and an MME may be more efficient than sending a location request to an MME via a GMLC. In certain example implementations, a PS-AP protocol may also be used to transport information between a proximity server and one or more UEs via an MME. For example, a PS-AP protocol may be used to transfer to a UE A from the proximity server the identities of one or more other UEs B discovered (e.g. by the proximity server) to be in proximity to the UE A for particular proximity services supported by or of interest to both the UE A and the UE(s) B. In certain implementations, a PS-AP protocol may be used to transfer to the proximity server from a UE updates on proximity services required by the UE (e.g., updates to certain parameters for an already known proximity service for the UE or updates concerning new proximity services that the UE may use).

In certain example implementations, techniques may be implemented to support ProSe signaling in an LTE network or with LTE-D using a PDP protocol Layer in association with a CP proximity server (e.g. as described in association with FIG. 14 and FIG. 7), a UP proximity server (e.g. as described in association with FIG. 15 and FIG. 9) or LTE-D signaling (e.g. in association with the protocol layering shown in FIG. 8). In certain example implementations, a PDP protocol may be used in a network mode to support discovery of proximity between UEs using a CP or UP proximity server (e.g., as described in association with FIG. 7 and/or FIG. 9) by enabling exchange of proximity related information between a UE and the CP or UP proximity server. Information may be transferred in both uplink and downlink directions by PDP in this case to authenticate proximity services claimed to be of interest to or supported by a UE (e.g. where proximity services claimed by a UE to be of interest or to be supported are compared to proximity services subscribed to by the UE that were transferred from the home HSS of the UE to the UE's serving MME. Information may also be transferred in an uplink direction by PDP (from a UE to a proximity server) that may include one or more of the UE's identity and/or location, proximity services of interest to the UE, the UE's current serving cell, information received directly by the UE from other UEs, and/or the UE's LTE-D capabilities, just to name a few examples. In some implementations, information may be transferred by PDP downlink (from a proximity server to a UE) that may include one or more of the identities of other UEs (e.g. UEs found to be in proximity to the recipient UE), a permission for the UE to use LTE-D mode and information regarding use of an LTE-D mode by the recipient UE, again just to name a few examples.

With regard to use of PDP to support an LTE-D Mode (e.g. using the protocol layering shown in FIG. 8), UEs may broadcast their identity or a pseudo-identity and proximity services of interest at an RRC level (e.g. with the protocol layering of FIG. 8), which may be passed up to the PDP* level at a recipient UE. Once RRC establishes potential or actual proximity between a pair of UEs or a network proximity server has informed one or both UEs about actual or potential proximity, a UE may use PDP* to signal additional information to the other UE (e.g., via broadcast or using an RRC signaling link previously established between the pair of UEs). In certain instances, a PDP* protocol used by UEs in an LTE-D mode may be a variant of (e.g. an extension of) the PDP protocol used between a UE and proximity server in network mode or may be a different protocol.

In certain example implementations, techniques may be implemented for Proximity Service Support via an Application (App) protocol layer—e.g. as applicable to the protocol layering described for FIG. 10. In certain implementations, an App layer may be associated with individual ProSe Apps and may be defined to support specific proximity services. For example, a particular application on a UE may support one or more proximity services, may be notified by some other process on the UE (e.g. a process supporting the PDP protocol discussed previously herein) when proximity has been discovered with another UE supporting one or more of the same proximity services and may then (e.g. under user control) proceed to communicate using the App protocol layer with a peer application in the other UE to support one or more proximity services of interest to the users of both UEs. In certain instances, an App layer may provide peer to peer (P2P) communication between Apps on pairs of UEs or on groups of three or more UEs. For UEs that make use of a network for communication (in network mode), an App layer may exchange Protocol Data Units (PDUs) between Apps in different UEs using one or more of IP bearers setup through the network, SMS, and/or SIP (via IMS), just to name a few examples. For UEs able to employ LTE-D mode for communication, an App layer may exchange PDUs between Apps in different UEs using IP bearers setup directly between the UEs using LTE-D—e.g., with protocol layering possibly as shown in FIG. 10. Alternatively, an App layer could transfer PDUs between UEs in LTE-D mode using the protocol layering shown in FIG. 8 but with an App protocol layer replacing the PDP* layer shown in FIG. 8. In this case, App layer PDU transfer may be based on NAS signaling support. In certain implementations, an App layer may be used to negotiate setup of communication between users, e.g., using speech, IM, video, etc., with communication conveyed either via a network or using LTE-D.

Figure 11:
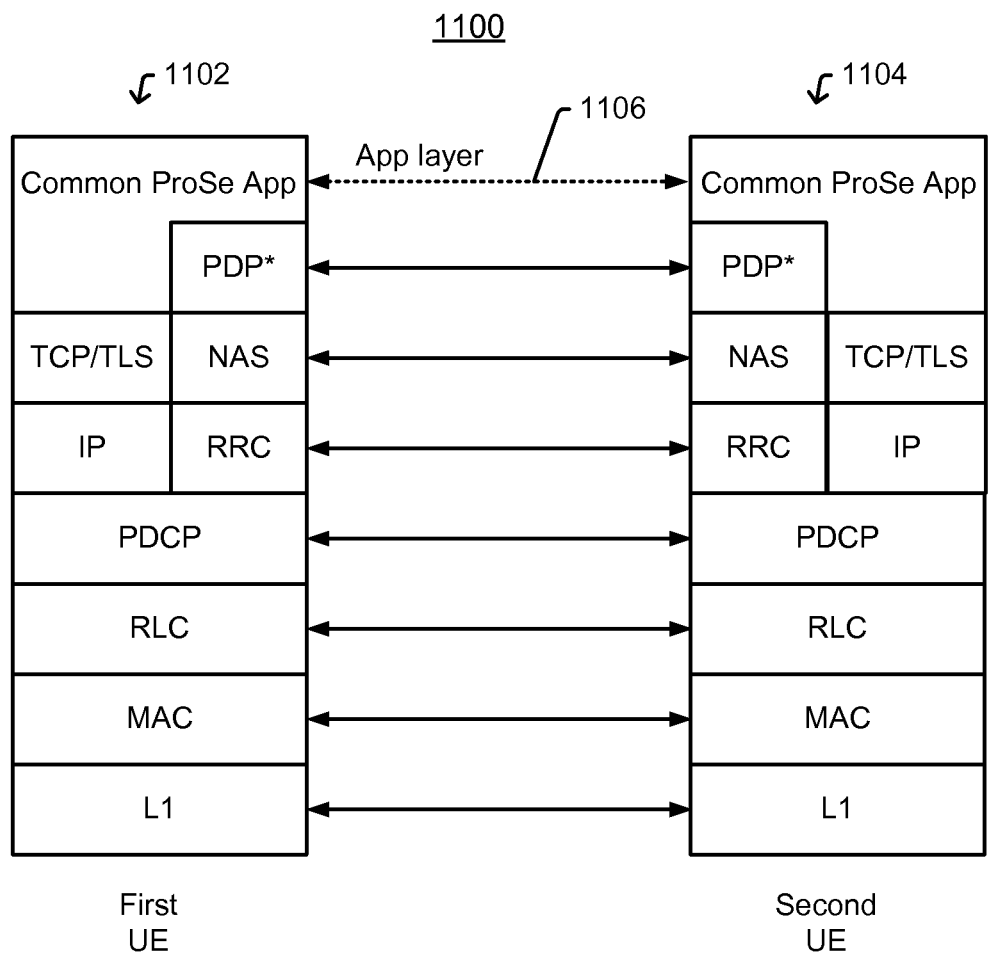
FIG. 11 illustrates example combined protocols that may be implemented to transmit and/or relay information for use in determining a state of proximity or supporting proximity services between two or more mobile devices, in accordance with an example implementation.

Attention is drawn next to FIG. 11, which illustrates example combined protocols 1100 that may be implemented to transmit, receive and/or relay information for use in supporting proximity services between two or more mobile devices, in accordance with an example implementation. Combined protocols 1100 illustrate an example architecture for LTE-D Mode that combines both CP protocols as in FIG. 8 with UP protocols as in FIG. 10. Included in example combined protocols 1100 are corresponding protocol stacks 1102 (for a first UE) and 1104 (for a second UE). As shown, example stacks 1102 and 1104 may comprise corresponding layers such as an L1, MAC, RLC, PDCP, IP, RRC, TCP/TLS, NAS, PDP*, and an App layer. These protocols may be the same as those described for FIGS. 8 and 10.

Example combined protocols 1100 shows how a UE may support a common ProSe App that manages ProSe discovery on behalf of other Apps in the UE that are each specific to particular proximity services, e.g., such as Public Safety and Friend Finder. The common ProSe App may be referred to as a ProSe engine or ProSe process and may (i) provide a common interface (e.g. via a common API) to other Apps on a UE that each support different proximity services and (ii) enable these other Apps to determine when their UE is in proximity to another UE containing the same App and supporting the same proximity service(s). In certain instances, the common ProSe App may employ PDP* or PDP (not shown in FIG. 11) and lower CP protocol layers for proximity discovery in either network mode (e.g. using the protocol layering of FIG. 7) or LTE-D mode (using the protocol layering shown in FIG. 8 and FIG. 11). In certain instances, the common ProSe App may use NAS in order to set up UE-UE data bearers or to exchange signaling messages at the CP level. In certain instances, the common ProSe App may use the UP layers (as shown in FIG. 10 and FIG. 11) for exchanging voice, other media and data. In certain implementations, the common ProSe App may use PDP and lower layer protocols to communicate with a network proximity server (not shown in FIG. 11 but as shown in FIG. 7 and/or FIG. 9,) if a UE is in network mode in order, for example, to discover proximity to other UEs. In certain instances, a pair of Apps supporting specific proximity services for two UEs, that have been determined to be in proximity by their respective Common ProSe Apps, may communicate with one another in LTE-D mode via their respective common ProSe Apps. In this case, the common ProSe Apps may transfer App PDUs between the pair of Apps via PDP* and NAS (e.g. using the protocol layering shown in FIG. 10) or via TCP/TLS and IP (e.g. using the protocol layering shown in FIG. 10). Alternatively, the pair of Apps may communicate in LTE-D mode directly, not via the common ProSe Apps, by making direct use of either the NAS (CP) layer (e.g. as in FIG. 8 with an App layer replacing the PDP* layer) or the TCP/TLS/IP (UP) layers (e.g. as in FIG. 10). The protocol that Apps may employ for communication via the common ProSe App or using direct communication is shown by the App layer dashed arrow 1106 in FIG. 11.

Figure 12:
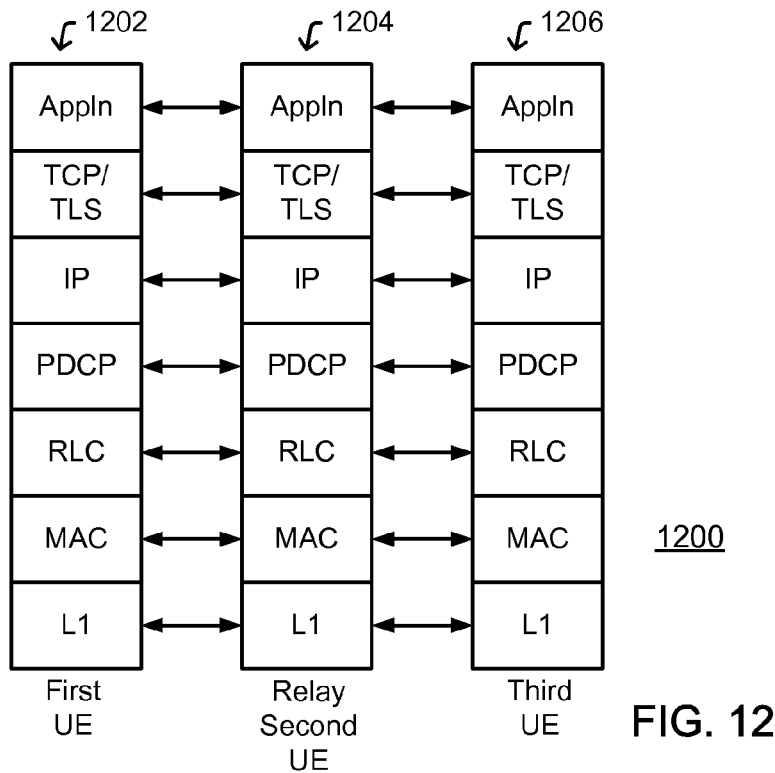
FIG. 12 and FIG. 13 illustrate some example protocols that may be implemented to transmit, receive and/or relay information between applications in two or more mobile devices, in accordance with an example implementation.
Figure 13:
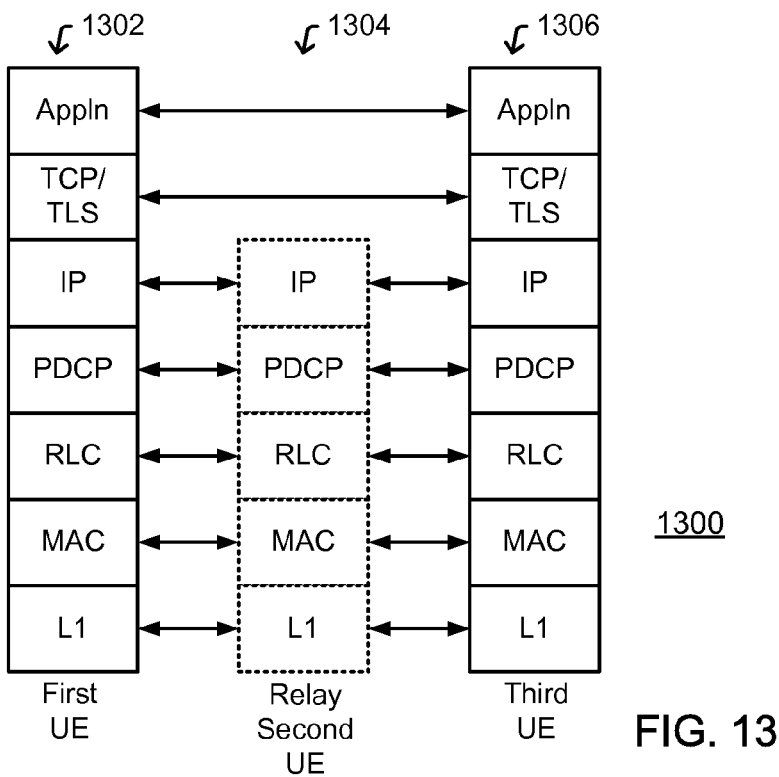

Attention is now drawn to FIG. 12 and FIG. 13, which illustrate some example protocols 1200 and 1300, respectively, that may be implemented to relay information between applications in two or more mobile devices, in accordance with an example implementation. For example, certain information may be relayed between ProSe Apps in LTE-D Mode. Example protocols 1200 may be used to provide relaying of certain information at the App Level, and example 1300 may be used to provide relaying of certain information at the IP Level. As shown, protocol 1200 may include a stack 1202 (for a first UE), a stack 1204 (for a relaying second UE), and a stack 1206 (for a third UE 3). Example stacks 1202, 1204 and 1206 may comprise corresponding layers such as L1, MAC, RLC, PDCP, IP, TCP/TLS, and an App protocol layer (denoted by the term Appln). As shown, protocols 1300 may include a stack 1302 (for a first UE), a stack 1304 (for a relaying second UE), and a stack 1306 (for a third UE). Example stacks 1302 and 1306 may comprise corresponding layers such as L1, MAC, RLC, PDCP, IP, TCP/TLS, and Appln, and example stack 1304 may comprise corresponding layers such as L1, MAC, RLC, PDCP, and IP. These protocol layers may correspond to those described for FIG. 10.

For the protocol alternatives described for FIG. 11, signaling messages (e.g. App PDUs) may be transferred between Apps (as described above) (i) via the common ProSe App using PDP* and NAS or (ii) using TCP/TLS and IP or (iii) directly using NAS or TCP/TLS/IP. For UEs not able to communicate with one another directly via LTE-D but able to communicate using LTE-D via one or more intermediate relay UEs, there may be some choice as to how the relaying is performed—e.g. concerning the protocol layers that need to be intercepted by relay UEs as opposed to being transferred end to end without interception. Relaying may be performed at intermediate UEs at (i) the Appln level (e.g. as shown in FIG. 12) in which the App protocol layer and all lower layers may be intercepted and relayed, (ii) at the PDP* level in which the PDP* layer and all lower layers (e.g. NAS, RRC, PDCP) may be intercepted and relayed, (iii) at the NAS level in which NAS and all lower protocol layers may be intercepted and relayed or (iv) at the IP level (e.g. as shown in FIG. 13) in which the IP layer and all lower layers may be intercepted and relayed. In certain instances, communication (e.g. speech, IM, video) transferred between users associated with a ProSe App may be more efficiently relayed at the IP level, e.g., as in FIG. 13.

In certain example implementations, a protocol layer at which relaying is performed may also be used to exchange information between nearby UEs to maintain information (in each UE) concerning which UEs may be in direct radio proximity with one another and via which intermediate relay UEs communication to other UEs may need to be routed. In certain instances, it may be useful to manage routing/relaying at the App level, e.g., making relaying at the App level a possible implementation alternative. However, exchange of routing related information may instead be provided at the PDP* layer or possibly provided in a new protocol associated with the NAS layer or IP layer, e.g., allowing relaying at these protocol levels. In certain instances, broadcast and relaying of basic information (e.g., as previously described in association with implicit and explicit acknowledgment and tagged transmission) may be used to support relaying and exchange of routing related information. A result may be that relaying information as described above (e.g. in association with FIGS. 12 and 13) at any level may be combined with the hop by hop routing method described earlier. In addition, relaying at the App level may be combined with efficient relaying described earlier using implicit or explicit acknowledgment, tagged transmission or source routing; and relaying information at the PDP* level or NAS level may be combined with source routing.

Figure 17:
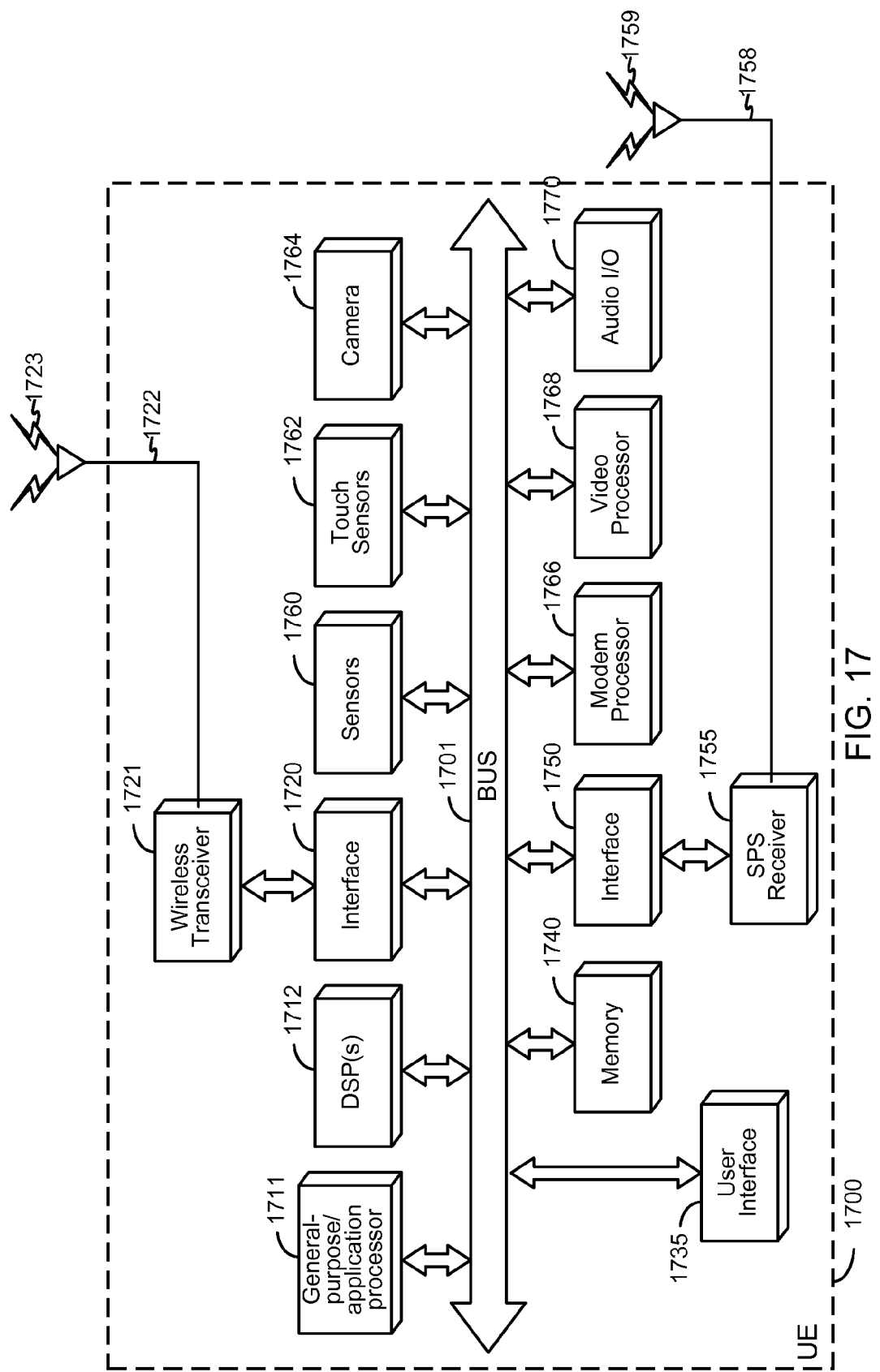
FIG. 17 is a schematic block diagram illustrating certain features of an example mobile device that may be used to determine or assist in determining a state of proximity between two or more mobile devices, in accordance with an example implementation.

FIG. 17 is a schematic diagram of a UE according to an implementation. UE 100 (FIG. 1) may comprise one or more features of UE 1700 shown in FIG. 17. In certain implementations, UE 1700 may also comprise a wireless transceiver 1721 which is capable of transmitting and receiving wireless signals 1723 via wireless antenna 1722 over a wireless communication network. Wireless transceiver 1721 may be connected to bus 1701 by a wireless transceiver bus interface 1720. Wireless transceiver bus interface 1720 may, in some implementations be at least partially integrated with wireless transceiver 1721. Some implementations may include multiple wireless transceivers 1721 and wireless antennas 1722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples. Wireless transceiver 1721 may, for example, comprise all or part of a communication interface 1830 (FIG. 18), Accordingly, the term "communication interface" as used herein may broadly represent a wireless transceiver 1721, a communication interface 1830, and/or the like or some combination thereof.

UE 1700 may also comprise SPS receiver 1755 capable of receiving and acquiring SPS signals 1759 via SPS antenna 1758. SPS receiver 1755 may also process, in whole or in part, acquired SPS signals 1759 for estimating a location of UE 1700. In some implementations, general-purpose processor(s) 1711, memory 1740, DSP(s) 1712 and/or specialized processors (not shown) may also be utilized to process acquired SPS signals, in whole or in part, and/or calculate an estimated location of UE 1700, in conjunction with SPS receiver 1755. Storage of SPS or other signals for use in performing positioning operations may be performed in memory 1740 or registers (not shown).

Also shown in FIG. 17, UE 1700 may comprise digital signal processor(s) (DSP(s)) 1712 connected to the bus 1701, general-purpose processor(s) 1711 connected to the bus 1701, and memory 1740. In certain implementations bus interface(s) (not shown) may be integrated with the DSP(s) 1712, general-purpose processor(s) 1711 and memory 1740. In various implementations, functions may be performed in response to execution of one or more machine-readable instructions stored in memory 1740 such as on a computer-readable storage medium, such as RAM, ROM, FLASH, or disc drive, just to name a few example. The one or more instructions may be executable by general-purpose processor(s) 1711, specialized processors, or DSP(s) 1712. Memory 1740 may comprise a non-transitory processor-readable memory and/or a computer-readable memory that stores software code (programming code, instructions, etc.) that are executable by processor(s) 1711 and/or DSP(s) 1712 to perform functions described herein.

Also shown in FIG. 17, a user interface 1735 may comprise any one of several devices such as, for example, a speaker, microphone, display device, vibration device, keyboard, touch screen, just to name a few examples. In a particular implementation, user interface 1735 may enable a user to interact with one or more applications hosted on UE 1700. Such applications (or Apps) may contain software stored in memory 1740 and run on processor(s) 1711 and/or or on DSP(s) 1712. For example, devices of user interface 1735 may store analog or digital signals on memory 1740 to be further processed by DSP(s) 1712 or general purpose processor 1711 in response to action from a user. Similarly, applications hosted on UE 1700 may store analog or digital signals on memory 1740 to present an output signal to a user. In another implementation, UE 1700 may optionally include a dedicated audio input/output (I/O) device 1770 comprising, for example, a dedicated speaker, microphone, digital to analog circuitry, analog to digital circuitry, amplifiers and/or gain control. It should be understood, however, that this is merely an example of how an audio I/O may be implemented in a UE, and that claimed subject matter is not limited in this respect. In another implementation, UE 1700 may comprise touch sensors 1762 responsive to touching or applying pressure on a keyboard or touch screen device.

UE 1700 may also comprise a dedicated camera device 1764 for capturing still or moving imagery. Camera device 1764 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose processor 1711 or DSP(s) 1712. Alternatively, a dedicated video processor 1768 may perform conditioning, encoding, compression or manipulation of signals representing captured images. Additionally, video processor 1768 may decode/decompress stored image data for presentation on a display device (not shown) on UE 1700.

UE 1700 may also comprise sensors 1760 coupled to bus 1701 which may include, for example, inertial sensors and environment sensors. Inertial sensors of sensors 1760 may comprise, for example accelerometers (e.g., collectively responding to acceleration of UE 1700 in three dimensions), one or more gyroscopes or one or more magnetometers (e.g., to support one or more compass applications). Environment sensors of UE 1700 may comprise, for example, temperature sensors, barometric pressure sensors, ambient light sensors, camera imagers, microphones, just to name few examples. Sensors 1760 may generate analog or digital signals that may be stored in memory 1740 and processed by DPS(s) or general purpose processor 1711 in support of one or more applications such as, for example, applications directed to positioning or navigation operations.

In a particular implementation, a digital map of an indoor area may be stored in a particular format in memory 1740. The digital map may have been obtained from messages containing navigation assistance data from a remote server. General purpose processor 1711 may execute instructions to processes the stored digital map to identify and classify component areas bounded by a perimeter of structures indicated in the digital map. These executed instructions may specify identifying and characterizing egress segments in structures forming a perimeter bounding a component area and classifying the bounded component area based, at least in part, on a proportionality of a size of at least one identified egress segment to a size of at least one dimension of the bounded component area. In one implementation, a UE may further apply crowed sourced data (e.g., obtained from a location server) to confirm an inferences of an egress segment. For example, if there is a history of UEs moving through a feature presumed to be an egress segment, the feature may be confirmed as providing an egress segment.

In a particular implementation, UE 1700 may comprise a dedicated modem processor 1766 capable of performing baseband processing of signals received and downconverted at wireless transceiver 1721 or SPS receiver 1755. Similarly, modem processor 1766 may perform baseband processing of signals to be upconverted for transmission by wireless transceiver 1721. In alternative implementations, instead of having a dedicated modem processor, baseband processing may be performed by a general purpose processor or DSP (e.g., general purpose processor 1711 or DSP(s) 1712). It should be understood, however, that these are merely examples of structures that may perform baseband processing, and that claimed subject matter is not limited in this respect.

Figure 18:
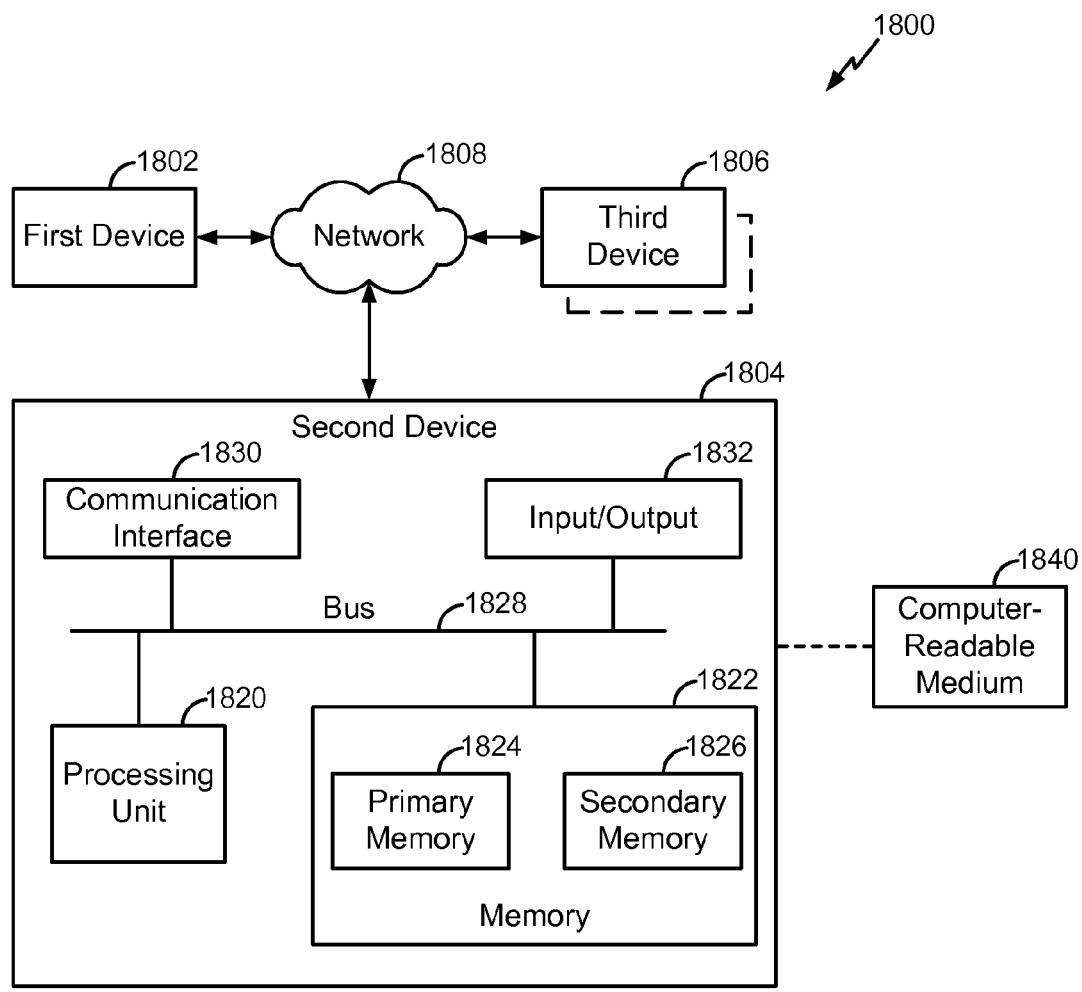
FIG. 18 is a schematic block diagram illustrating certain features of an example electronic device that may be used to determine or assist in determining a state of proximity between two or more mobile devices, in accordance with an example implementation.

FIG. 18 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a single wireless communications network 1808 or through several interconnected serving wireless communication networks—e.g. a different serving network for each device (not shown in FIG. 18). In an aspect, first device 1802 may comprise a server capable of providing positioning assistance data such as, for example, a base station almanac. First device 1802 may also comprise a server capable of providing indoor positioning assistance data relevant to a location specified in a request from a UE. First device 1802 and/or second device 1804 may also comprise a Proximity server such as CP Proximity server 708 in FIG. 7, UP Proximity server 910 in FIG. 9, Proximity server 1408 in FIG. 14. Proximity server 1512 in FIG. 15 and Proximity server 1622 in FIG. 16. Second device 1804 and third device 1806 may comprise UEs, in an aspect. Also, in an aspect, wireless communications network 1808 may comprise one or more wireless access points, for example. However, claimed subject matter is not limited in scope in these respects.

First device 1802, second device 1804 and third device 1806, as shown in FIG. 18, may be representative of any device, appliance or machine (e.g., such as local transceiver 115 or servers 140, 150 or 155 as shown in FIG. 1) that may be configurable to exchange data over wireless communications network 1808. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first device 1802, second device 1804, and/or third device 1806, may comprise one or more of a base station almanac server, a base station, or a UE in accordance with the examples described herein.

Similarly, wireless communications network 1808 (e.g., in a particular of implementation of network 130 shown in FIG. 1), may be representative of one or more communication links, processes, or resources configurable to support the exchange of data between at least two of first device 1802, second device 1804, and third device 1806. By way of example but not limitation, wireless communications network 1808 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in system 1800, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820.

In a particular implementation, information received from mobile devices and/or from elements in network 1808 related to proximity between mobile devices and/or proximity services supported by mobile devices may be stored in a particular format in memory 1822. Processing unit 1820 may execute instructions to processes the stored proximity related information—e.g. in order to discover proximity between mobile devices and notify mobile devices of any discovered proximity.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to at least wireless communications network 1808. By way of example but not limitation, communication interface 1830 may include a network interface device or card, a modem, a router, a switch, a transceiver, and the like. Communication interface 1830 may, for example, comprise all or part of a wireless transceiver 1721 (FIG. 17), Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

Figure 19:
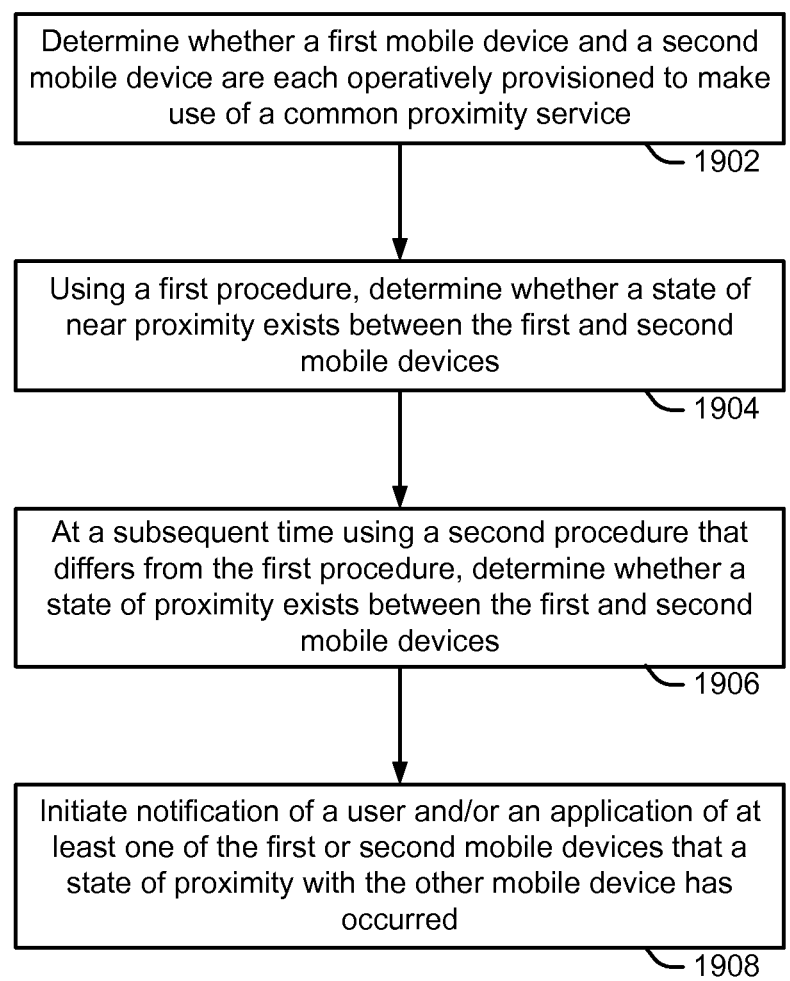
FIG. 19 is flow diagrams illustrating an example process that may be implemented within one or more computing devices to determine or assist in determining a state of proximity between two or more mobile devices, in accordance with an example implementation.

FIG. 19 is a flow diagram illustrating an example process 1900 that may be implemented within a computing device (e.g. UE 1700 or system 1800), e.g., to support proximity services.

At example block 1902, a determination may be made as to whether a first mobile device and a second mobile device are each operatively provisioned to make use of a common proximity service. The determination in example block 1902 and the actions in subsequent example blocks may be performed by the first mobile device, the second mobile device and/or by a network—e.g. by a proximity server in a network. At example block 1904, a first procedure may be used to determine whether a state of near proximity exists between the first and second mobile devices, e.g., wherein the first and second mobile devices are not in proximity. The first procedure may be efficient but not accurate—e.g. may rely on a current serving cell, tracking area of WiFi access point for each of the first and second mobile devices or on coarse location estimates. At example block 1906 (e.g., at a subsequent time) a second procedure may be used to determine whether a state of proximity exists between the first and second mobile devices, e.g., wherein the second procedure differs from the first procedure. The second procedure may differ from the first procedure and be more accurate but less efficient—e.g. may rely on detection of direct radio signals transmitted by each device and/or on accurate location estimates. At example block 1908, notification of a user and/or an application of at least one of the first or second mobile devices may be initiated, which indicates a state of proximity with the other mobile device has occurred (e.g., is determined to exist per example block 1906).

In certain example implementations, a computing device may initiate notification of a user and/or an application of a first mobile device or a second mobile device that a state of proximity has occurred. For example, in certain instances, such a computing device may be a mobile device comprising an input/output device through which a processor of the mobile device may initiate notification of a user. In another example implementation, such a computing device may be a server or other like network device, comprising a communication interface, through which a processor of the computing device may initiate notification of a user or application.

As previously illustrated, in certain instances a distance threshold between the first and second mobile devices may be used for determining that a state of near proximity exists in example block 1904 or that a state of proximity exists in example block 1906. The distance threshold may require that an estimated distance between the first and the second mobile devices is less than or greater than a certain threshold distance. In certain instances, a signal level threshold between the first and second mobile devices may be used for determining that a state of near proximity exists in example block 1904 or that a state of proximity exists in example block 1906. The signal level threshold may require that a measured signal level for direct transmission from the first mobile device to the second mobile device or vice versa is less than or greater than a certain threshold signal level.

In certain example implementations, a first procedure as used in block 1904 may use fewer resources than the second procedure as used in block 1906. In instances, a second procedure as used in block 1906 may determine proximity more accurately than the first procedure. In certain instances, a first procedure as used in block 1904 may use a coarser location accuracy and/or a lower scan frequency than a second procedure as used in block 1906. In certain instances, a second procedure as used in block 1906 may be performed more frequently than a first procedure as used in block 1904.

In certain example implementations, a first procedure as used in block 1904 may be based, at least in part, on one or more of a serving cell, a location area, a tracking area, a previous location estimate, a visible WiFi Access Point, and/or the like or some combination thereof which may correspond to one or both of the first or second mobile devices.

In certain example implementations, a second procedure as used in block 1906 may use a geographic location estimate, a measured round trip propagation time, a direct radio contact, and/or the like or some combination thereof which may correspond to one or both of the first or second mobile devices.

In certain example implementations, a first procedure as used in block 1904 may use a geographic location area common to two or more networks. In certain instances, a first mobile device may be served by a different network than a second mobile device.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more UEs may communicate with a femtocell via a code division multiple access ("CDMA") cellular communication protocol, for example, and the femtocell may provide the UE access to a larger cellular telecommunication network by way of another broadband network such as the Internet.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method of supporting proximity services for a mobile device comprising, with a computing device:
   determining whether a first mobile device and a plurality of second mobile devices are operatively provisioned to make use of a common proximity service, at least in part, by verifying that the plurality of second mobile devices have communicated expressions identifying the common proximity service to the first mobile device;
   determining, using a first procedure, whether two or more of the plurality of second mobile devices are in near proximity to the first mobile device;
   determining at a subsequent time and using a second procedure that a state of proximity exists between the first mobile device and each of the two or more second mobile devices, wherein the two or more second mobile devices excludes at least one other second mobile device among the plurality of second mobile devices; and initiating notification to a user and/or an application, or a combination thereof, that the state of proximity exists.

2. The method of claim 1, wherein a distance threshold between the first mobile device and the plurality of second mobile devices for determining near proximity exceeds a distance threshold for determining the state of proximity.

3. The method of claim 1, wherein the first procedure uses fewer resources than the second procedure.

4. The method of claim 1, wherein the second procedure determines proximity more accurately than the first procedure.

5. The method of claim 1, wherein the first procedure uses a coarser location accuracy or a scan frequency lower than a scan frequency of the second procedure, or a combination thereof.

6. The method of claim 1, wherein the first procedure is based, at least in part, on a serving cell, a location area, a tracking area, a previous location estimate or a visible WiFi Access Point corresponding to at least one of the first mobile device and/or the plurality of second mobile devices, or a combination thereof.

7. The method of claim 1, wherein the second procedure uses one or more of a geographic location estimate, a measured round trip propagation time, and/or a direct radio contact corresponding to at least one of the first mobile device and/or each of the two or more second mobile devices, or combination thereof.

8. The method of claim 1, wherein the first procedure uses a geographic location area common to two or more networks.

9. The method of claim 1, wherein the first mobile device is served by a different network than the plurality of second mobile devices.

10. The method of claim 1, wherein the second procedure is performed more frequently than the first procedure.

11. An apparatus for use in supporting proximity services for a first mobile device, the apparatus comprising:
    means for determining whether a first mobile device and a plurality of second mobile devices are operatively provisioned to make use of a common proximity service, at least in part, by verifying that the plurality of second mobile devices have communicated expressions identifying the common proximity service to the first mobile device;
    means for determining, using a first procedure, whether two or more of the plurality of second mobile devices are in near proximity to the first mobile device;
    means for determining at a subsequent time and using a second procedure that a state of proximity exists between the first mobile device and each of the two or more second mobile devices, wherein the two or more second mobile devices excludes at least one other second mobile device of the plurality of second mobile devices; and
    means for initiating notification to a user and/or an application, or a combination thereof, that the state of proximity exists.

12. The apparatus of claim 11, wherein a distance threshold between the first mobile device and the plurality of second mobile devices for determining near proximity exceeds a distance threshold for determining the state of proximity.

13. The apparatus of claim 11, wherein:
    the first procedure uses fewer resources than the second procedure,
    the second procedure determines proximity more accurately than the first procedure,
    the first procedure uses at least one of a coarser location accuracy and/or a lower scan frequency than the second procedure, or
    the second procedure is performed more frequently than the first procedure, or a combination thereof.

14. The apparatus of claim 11, wherein the first procedure uses a geographic location area common to two or more networks.

15. The apparatus of claim 11, wherein the first mobile device is served by a different network than at least one of the plurality of second mobile devices.

16. A computing device to support proximity services for a mobile device, the computing device comprising:
   memory; and
   a processor, coupled to the memory, and configured to:
   determine whether a first mobile device and a plurality of second mobile devices are operatively provisioned to make use of a common proximity service, at least in part, by verification that the plurality of second mobile devices have communicated expressions identifying the common proximity service to the first mobile device;
   determine, using a first procedure, whether two or more of the plurality of second mobile devices are in near proximity to the first mobile device;
   determine at a subsequent time and using a second procedure that a state of proximity exists between the first mobile device and each of the two or more second mobile devices, wherein the two or more second mobile devices excludes at least one other second mobile device of the plurality of second mobile devices; and
   initiate notification to a user and/or an application, or a combination thereof, that the state of proximity exists.

17. The computing device of claim 16, wherein a distance threshold between the first mobile device and the plurality of second mobile devices for determining near proximity exceeds a distance threshold for determining the state of proximity.

18. The computing device of claim 16, wherein the first procedure uses fewer resources than the second procedure.

19. The computing device of claim 16, wherein the second procedure determines proximity more accurately than the first procedure.

20. The computing device of claim 16, wherein the first procedure uses a coarser location accuracy or a scan frequency lower than a scan frequency of the second procedure, or a combination thereof.

21. The computing device of claim 16, wherein the first procedure is based, at least in part, on a serving cell, a location area, a tracking area, a previous location estimate, or a visible WiFi Access Point corresponding to at least one of the first mobile device and/or the plurality of second mobile devices, or a combination thereof.

22. The computing device of claim 16, wherein the second procedure uses one or more of a geographic location estimate, a measured round trip propagation time, or a direct radio contact corresponding to at least one of the first mobile device and/or each of the two or more second mobile devices, or a combination thereof.

23. The computing device of claim 16, wherein the first procedure uses a geographic location area common to two or more networks.

24. The computing device of claim 16, wherein the first mobile device is served by a different network than at least one of the plurality of second mobile devices.

25. The computing device of claim 16, wherein the second procedure is performed more frequently than the first procedure.

26. An article comprising:
   a non-transitory computer readable medium having stored thereon computer implementable instructions executable by a processor in a computing device to:
   determine whether a first mobile device and a plurality of second mobile devices are operatively provisioned to make use of a common proximity service, at least in part, by verification that the plurality of second mobile devices have communicated expressions identifying the common proximity service to the first mobile device;
   determine, using a first procedure, whether two or more of the plurality of second mobile devices are in near proximity to the first mobile device;
   determine at a subsequent time and using a second procedure that a state of proximity exists between the first mobile device and each of the two or more second mobile devices, wherein the two or more second mobile devices excludes at least one other second mobile device among the plurality of second mobile devices; and
   initiate notification to a user and/or an application, or a combination thereof, that the state of proximity exists.

27. The article of claim 26, wherein a distance threshold between the first mobile device and the plurality of second mobile devices for determining near proximity exceeds a distance threshold for determining the state of proximity.

28. The article of claim 26, wherein:
   the first procedure uses fewer resources than the second procedure,
   the second procedure determines proximity more accurately than the first procedure,
   the first procedure uses at least one of a coarser location accuracy and/or a lower scan frequency than the second procedure, or
   the second procedure is performed more frequently than the first procedure, or a combination thereof.

29. The article of claim 26, wherein the first procedure uses a geographic location area common to two or more networks.

30. The article of claim 26, wherein the first mobile device is served by a different network than the plurality of second mobile devices.

31. The method of claim 1, wherein the second procedure differs from the first procedure.

* * * * *